United States Patent
Reichstetter et al.

(10) Patent No.: US 8,251,390 B2
(45) Date of Patent: Aug. 28, 2012

(54) SYSTEM AND METHOD FOR PROVIDING GYROSCOPIC STABILIZATION TO A WHEELED VEHICLE

(75) Inventors: Daniella Reichstetter, San Francisco, CA (US); Sascha M. Retailleau, San Francisco, CA (US); Charles S. McCall, San Francisco, CA (US); Nathan Sigworth, Hamden, CT (US); Brian Q. Huppi, San Francisco, CA (US); Peter E. Von Behrens, San Francisco, CA (US); Scott Whitman, San Francisco, CA (US); Hannah Murnen, LaGrange, IL (US); Deborah Sperling, Lincoln, MA (US); Augusta Niles, Norwich, VT (US)

(73) Assignee: The Gyrobike, Inc., San Francisco, CA (US)

( * ) Notice: Subject to any disclaimer, the term of this patent is extended or adjusted under 35 U.S.C. 154(b) by 229 days.

(21) Appl. No.: 12/573,858

(22) Filed: Oct. 5, 2009

(65) Prior Publication Data

US 2010/0090440 A1 Apr. 15, 2010

Related U.S. Application Data

(60) Continuation-in-part of application No. 11/967,491, filed on Dec. 31, 2007, now Pat. No. 7,597,337, which is a division of application No. 11/170,993, filed on Jun. 30, 2005, now Pat. No. 7,314,225.

(51) Int. Cl.
 *B62M 1/10* (2010.01)
(52) U.S. Cl. ......................... 280/217; 280/293
(58) Field of Classification Search .................. 280/212, 280/215, 217, 293
See application file for complete search history.

(56) References Cited

U.S. PATENT DOCUMENTS

| | | |
|---|---|---|
| 2,141,233 A | 12/1938 | Alexander |
| 3,511,454 A | 5/1970 | Hamilton |
| 3,787,066 A | 1/1974 | Hautier |

(Continued)

FOREIGN PATENT DOCUMENTS

DE 88 04 997.3 U1 9/1988

(Continued)

*Primary Examiner* — Kevin Hurley
(74) *Attorney, Agent, or Firm* — William A. Loginov, Esq.; Loginov & Associates, PLLC

(57) ABSTRACT

This invention provides a stabilizing system and method for two-wheeled vehicles that affords the rider no restriction on the full range of movements (banks, leans, etc.) common to bicycles, but that provides greater stability during turns and other maneuvers so that an unintentional bank or tilt (potentially causing a fall) is less likely, even at relatively slow speeds and startup. A rotating mass of predetermined mass-value and radial mass-distribution is provided coaxially with the front axle. The mass is supported on bearings so as to freewheel with respect to the rotation of the front wheel. As such it can be induced to spin significantly faster than the front wheel thereby generating a gyroscopic effect at the front wheel about the axle. This gyroscopic effect influences the steering of the wheel by the rider. Due to precession, the wheel tends to follow any excessive bank by the vehicle, ensuring that the rider can "steer-out-of" an unintended tilt or bank. Likewise, the gyroscopic effect limits the rider's ability to execute excessive steering, thereby preventing jackknife movements. The mass can be an electric-motor-driven flywheel within a shell housing that includes a battery, control system and drive motor. The drive motor engages a surface of the flywheel with a drive tire in a resilient manner to reduce potential damage to the motor.

12 Claims, 20 Drawing Sheets

U.S. PATENT DOCUMENTS

| | | | |
|---|---|---|---|
| 4,272,094 A | 6/1981 | Patrin | |
| 4,305,572 A | 12/1981 | Elliot | |
| 4,353,569 A | 10/1982 | Molina | |
| 4,363,186 A | 12/1982 | Goldfarb et al. | |
| 4,463,515 A | 8/1984 | Barlow et al. | |
| 4,712,806 A | 12/1987 | Patrin | |
| 4,740,001 A | 4/1988 | Torleumke | |
| 5,338,204 A | 8/1994 | Herndon | |
| 5,395,130 A | 3/1995 | Rubin | |
| 5,791,675 A | 8/1998 | Fleischer | |
| 5,915,711 A | 6/1999 | Seiple | |
| 5,960,900 A | 10/1999 | Cheng | |
| 5,988,663 A | 11/1999 | Starks | |
| 6,095,891 A | 8/2000 | Hoeting et al. | |
| 6,113,122 A | 9/2000 | Plana | |
| 6,175,172 B1 | 1/2001 | Bakholdin et al. | |
| 6,286,849 B1 | 9/2001 | Slattery | |
| 6,349,958 B1 | 2/2002 | Gawlik | |
| 6,360,838 B1 | 3/2002 | Kulhavy | |
| 6,382,338 B1 | 5/2002 | Forbes | |
| 6,474,670 B2 | 11/2002 | Shaw | |
| 6,527,071 B1 | 3/2003 | Villedieu | |
| 6,581,494 B2 | 6/2003 | Sechler | |
| 6,676,150 B1 | 1/2004 | Goldstein | |
| 6,676,476 B1 | 1/2004 | Lund et al. | |
| 6,688,630 B1 | 2/2004 | Kayne | |
| 6,764,374 B2 | 7/2004 | Tilbor et al. | |
| 6,920,953 B2 | 7/2005 | McGovern | |
| 2005/0127767 A1 | 6/2005 | Gallant | |
| 2006/0009119 A1 | 1/2006 | Hoeting et al. | |
| 2007/0001423 A1 | 1/2007 | Murnen et al. | |

FOREIGN PATENT DOCUMENTS

| | | |
|---|---|---|
| DE | 44 04 949 A1 | 8/1995 |
| GB | GB 2 409 843 A | 7/2005 |
| JP | 62-292582 | 12/1987 |
| JP | 64-83487 | 3/1989 |
| WO | WO 2004026649 A1 | 4/2004 |
| WO | WO 2005079255 A2 | 9/2005 |

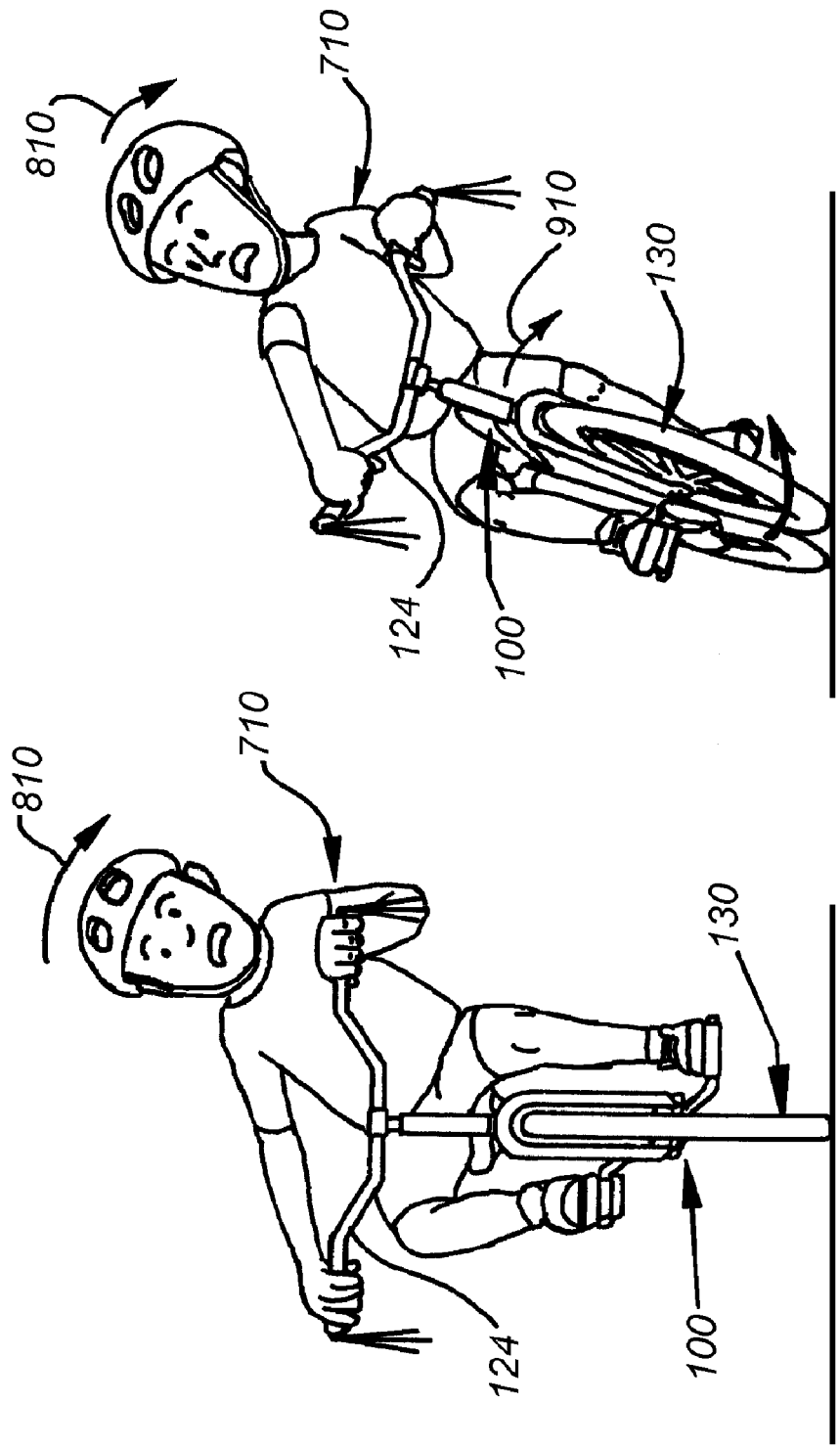

SYSTEM AND METHOD FOR PROVIDING GYROSCOPIC STABILIZATION TO A WHEELED VEHICLE

RELATED APPLICATIONS

This application is a continuation-in-part of patent application. Ser. No. 11/967,491, filed Dec. 31, 2007 now U.S. Pat. No. 7,597,337, entitled SYSTEM AND METHOD FOR PROVIDING GYROSCOPIC STABILIZATION TO A TWO-WHEELED VEHICLE, the entire disclosure of which is herein incorporated by reference, which is a divisional of U.S. patent application Ser. No. 11/170,993, filed Jun. 30, 2005, entitled SYSTEM AND METHOD FOR PROVIDING GYROSCOPIC STABILIZATION TO A TWO-WHEELED VEHICLE, now U.S. Pat. No. 7,314,225, the entire disclosure of which is herein incorporated by reference.

FIELD OF THE INVENTION

This invention relates to stabilization systems for wheeled vehicles and training devices for new riders of such vehicles.

BACKGROUND OF THE INVENTION

Learning to ride a bicycle, or similar human-powered vehicle, is one of the more difficult physical challenges faced by young children (and some older ones). Children must develop awareness of what are, in essence, complex Newtonian principles of force-balance, gravity, torque, inertia and momentum. Only by continually adjusting weight and balance for the prevailing velocity and turn radius can one proficiently ride a bicycle for any distance. Starting a bicycle from a standing position is a particular challenge as the forward velocity needed to maintain balance has not yet been established. Likewise, turns are difficult for new riders as the weight and balance of the bicycle and rider shifts suddenly and may become difficult to control. It is not uncommon for new riders to jackknife the bicycle wheel, causing both bike and rider to tumble over.

The time-tested approach to preparing children to ride by exposing them to the basic dynamics of a bicycle is the use of training wheels. Briefly, training wheels are typically a pair small-diameter, hard rubber/plastic wheels attached by removable brackets to the rear axle. When properly installed, the training wheels each extend outwardly (in an axial direction) from a respective axle end several inches, and are mounted so that their lowest points are slightly above the contact point of the rear wheel with the ground. In this manner, the training wheels allow the rider to lean slightly in either direction with one training wheel, or the other, engaging the ground to prevent the bicycle for tipping further.

While training wheels are a common accessory on the bicycles of young riders, the traditional ritual of removing them, and allowing the rider to ride without these aids, is often fraught with peril and scraped knees. Basically, the rider must now experience a new range of dynamics that were unknown while the training wheels were still attached. Generally, training wheels are inadequate because they do not simulate real, unrestricted bicycle movement. They incorrectly teach riders to balance by relying on the training wheels rather than actually learning to balance through weight manipulation. Moreover, training wheels inhibit riders from banking as they turn, forcing them into bad habits. They rely on the training wheels, making the transition to autonomous riding extremely difficult.

It is highly desirable to provide a training device that can be used following, or as a substitute to, training wheels that allows new riders to experience the full range of dynamic forces associated with riding while still providing a degree of safety during startup turns and slow riding. In particular, a device that enables children to ride stably at the relatively slow speed of between 2.5 and 5 mph (common for most new riders), and potentially faster while still feeling the stability and behavior of a significantly faster moving bike is highly desirable. More generally, it is desirable to provide a device that enables all riders who desire or require added stability during startup and subsequent to startup to enjoy the benefits of such.

SUMMARY OF THE INVENTION

This invention overcomes the disadvantages of the prior art by providing a stabilizing system and method for wheeled vehicles (for example, motorized and human-powered bicycles, unicycles and/or tricycles, as well as specialized devices, such as hand-pedaled and reclining cycles) that affords the rider no restriction on the full range of movements (banks, leans, etc.) common to cycles, but that provides greater stability during turns and other maneuvers so that an unintentional bank or tilt (potentially leading to a fall) is less likely, even at relatively slow speeds and startup. A rotating mass of predetermined mass-value and radial mass-distribution is provided (in an illustrative embodiment) coaxially with the front axle. The mass is supported on bearings so as to freewheel with respect to the rotation of the front wheel. As such it can be induced to spin significantly faster than the front wheel thereby generating a gyroscopic effect at the front wheel about the axle. The rotating mass can define a flywheel structure in an illustrative embodiment. This gyroscopic effect induced on the wheel influences the steering of the wheel by the rider. Due to precession, the wheel tends to follow any excessive bank by the bicycle, ensuring that the rider can "steer-out-of" an unintentional tilt. Likewise, the gyroscopic effect limits the rider's ability to execute excessive steering, thereby preventing jackknife movements. The mass can be an electric-motor-driven flywheel within a shell housing that includes a battery, control system and drive motor. The drive motor includes a frictional drive tire that engages the surface of the flywheel under a movable spring pressure that accommodates any unevenness between the motor and the surface of the flywheel, so as to avoid possible damage to the motor.

In an illustrative embodiment, mass is mounted on bearings that are themselves mounted over the center hub of the cycle wheel. The cycle wheel is, in turn, mounted conventionally on a threaded axle that is attached to the front fork by opposing nuts. The mass of this embodiment is unpowered, and initially forced into rotation by action of a helper (adult) as the rider starts the ride. It can be urged to rotate using a variety of permanently attached and/or detachable mechanisms. One such mechanism employs a wrapped cord and a reel with a ratchet system that locks the reel in a cord-pulling direction and a spring that rewraps the cord in an opposite, cord-retracting direction. Alternatively, a removable rack and mass-mounted pinion can be used to rotate the mass. In another alternative embodiment, the mass can be rotated using a drill or other cordless/corded electrical device having an elastomeric attachment (or gear) that engages an appropriate drive hub on the mass. The attachment is inserted into contact with the hub for a small duration in which rotational motion is imparted to the drive hub from the electrical device.

The device is then removed. The mass may rotate for a minute or more given proper bearings and balance.

In another embodiment, the mass can be permanently and selectively powered using, for example, a motor assembly that is coaxial with the wheel hub. A battery or other power source can be attached to the vehicle to provide continuous power. Such a powered implementation may be particularly suited for and adapted to disabled or older riders who require extra assistance. In addition, in alternate embodiments it is expressly contemplated that the rotating mass (powered or unpowered) can be provided non-coaxially within the structure of the steerable front wheel. Appropriate mountings and/or spaces can be provided to allow the non-coaxial mass to rotate appropriately free of interference from the moving wheel.

In an illustrative embodiment, there can be provided a front and/or steerable wheel (hub) assembly that is constructed and arranged to be fit onto a tire of a wheeled vehicle. The wheel assembly includes a flywheel assembly, rotatably mounted therein. The wheel assembly according to this embodiment encloses a rechargeable battery and a battery-powered electric motor that continuously drives a drive wheel in pressurable contact with the flywheel for initiating and maintaining rotation of the flywheel. The flywheel rotates freely about an axle of the wheel, on appropriate bearings that isolate its rotation from that of the wheel hub and tire to provide gyroscopic stabilization to the overall rotating wheel, and thus to the wheeled vehicle.

According to an illustrative embodiment, the wheel assembly includes a pair of outer shells (termed, for example first shell half and second shell half) that nest together to securely fit (clamshell-like) within each other to define a tire-engaging wheel rim. These shell halves together retain the flywheel assembly, electric motor, drive wheel, battery, motor control and associated circuitry within the interior defined by the halves of the wheel assembly. The pressurably contacting, motorized drive wheel initiates rotation of the flywheel by spinning the flywheel at one of a plurality of predetermined speeds. The motor control can step up and step down a series of incremental drive wheel speeds so as to approximately match the observed/predicted acceleration and deceleration rates (respectively) of the flywheel, based upon its inherent inertia. Alternately, the motor control can be adapted to sense the prevailing speed of the flywheel and apply incremental acceleration torque or deceleration braking as appropriate. Likewise, the control can be adapted, with appropriate charging circuitry to engage in regenerative braking when the motor is deactivated so as to recharge the battery assembly as the flywheel decelerates to rest. More particularly, the control is constructed and arranged to provide power from the electric motor to the battery when the flywheel is directed to spin down (i.e. the motor is deactivated via the push button or another command or state—such as a low-power state in the power supply/battery). Appropriate bearings and braces are provided in the wheel assembly to ensure the flywheel rotates freely therein and independent of the rotation of the assembly halves and the tire, which are separately mounted on bearings with respect to the common axle. The internal electrically driven wheel is spring biased into contact with the flywheel to initiate and maintain rotation of the flywheel.

BRIEF DESCRIPTION OF THE DRAWINGS

The invention description below refers to the accompanying drawings, of which:

FIG. 8 is a front view of the bicycle and rider of FIG. 7 now in motion, and experiencing an imbalance;

FIG. 9 is a front view of the bicycle and rider of FIG. 7 in which the imbalance of FIG. 8 has induced an unintentional bank or tilt;

DETAILED DESCRIPTION

Figure 1:
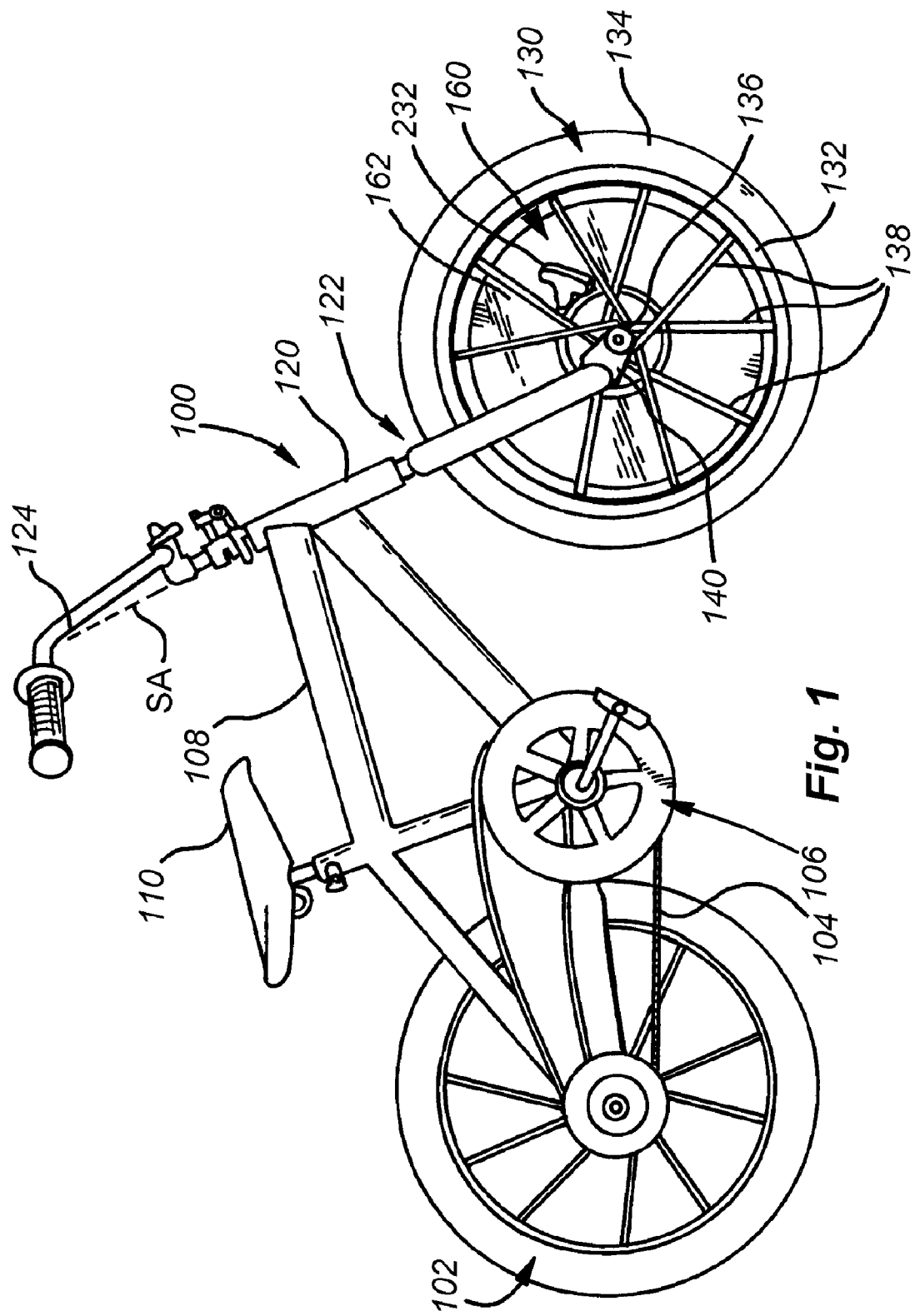
FIG. 1 is a side view of a bicycle equipped with a stabilizing system according to an illustrative embodiment of this invention.

A bicycle 100 having a stabilizing system according to an illustrative embodiment of this invention is shown in FIG. 1. This bicycle is exemplary of a certain size and style of human-powered two-wheeled vehicle that is particularly adapted for smaller children. The terms "bicycle" and "vehicle" as used herein are expressly intended to refer to any type of two-wheeled vehicle (including certain powered vehicles) that would benefit from the front-wheel gyroscopic stabilizing effect to be described herein.

The bicycle 100 includes a conventionally mounted rear wheel assembly 102, driven by a chain 104 that is, in turn operatively connected to a pedal crank assembly 106. The bicycle frame 108 is constructed from a set of joined tubular members that support a seat 110 above the frame 108 and is general alignment with the pedal crank assembly 106 so that a rider (see below) can reach and operate the pedals with his or her feet.

The front of the frame 108 includes a down-tube with internal bearings (not shown) that rotatably supports a front fork assembly 122 operatively connected to handlebars 124 of conventional design. On the lower end of the fork assembly 120, a front wheel 130 assembly is rotatably mounted. In this embodiment, the front wheel assembly 130 includes an outer hub 132 upon which is mounted a tire (and inner tube not shown) 134. The outer hub 132 is supported radially and axially with respect to an inner hub 136 by a set of spokes 138. The inner hub is attached to the fork assembly's lower fork ends 140 as described further below. The attachment allows the inner hub 136 to rotate freely so that the bicycle can move in forward and reverse motion (forward motion being generally driven by the rear wheel assembly 102). Likewise, the handlebars rotate within a predetermined range (at least) about the steering axis (dashed line SA) to allow the front wheel to turn with respect to the frame.

Figure 2:
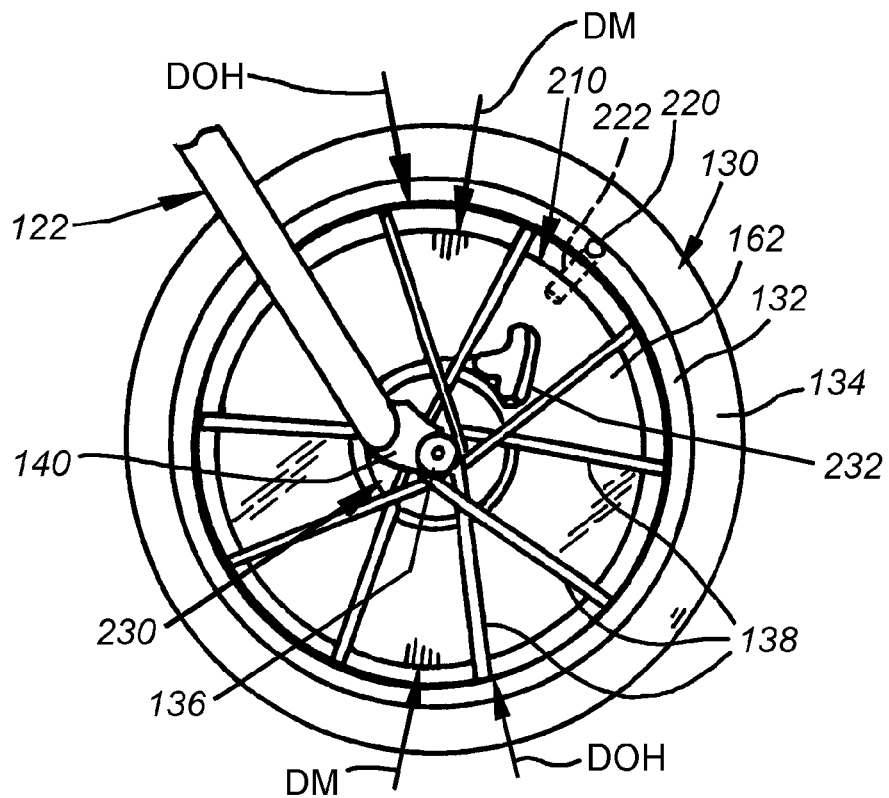
FIG. 2 is a fragmentary side view of a front wheel for the bicycle of FIG. 1 including the stabilizing system having a rotating mass according to one embodiment.

Notably, the front wheel assembly 130 includes a rotating mass or "flywheel" assembly 160 mass according to an embodiment of this invention. With reference also to FIG. 2, the mass 160 is a circular disk 162 having a width (described below) that is nested within and passes freely between spokes 138 on each of opposing sides of the front wheel assembly 130. The outside diameter DM of the mass disk 162 is smaller than the inner diameter DOH of the outer hub 132. The difference between diameters is sufficient to allow the outside perimeter edge 210 of the disk 162 to clear the convergence of the spokes 138 that join along the narrowed outer hub from each of opposing sides of the wider inner hub 136. In other words, the spokes generally define an equilateral triangle with the apex adjacent to the outer hub and the base at the inner hub. Since the apex region is quite narrow, the radial height of the disk should be short of the apex or any appreciable thickness in the disk will cause it to contact the spokes. However the disk diameter DM can be increased to nearly that (diameter DOH) of the inner hub by making the disk thin, particularly near its outer perimeter 210. Conversely, as will be discussed further below, it is desirable to maintain the concentration of mass in the disk as far from the center (axis of disk rotation) to attain a high I value for the disk without rendering the disk overly heavy.

In order to accommodate a large-diameter disk, the outer hub 132 has been modified to locate the tire fill stem 220 so as to project from the side of the hub 132, rather than the inner circumferential wall (as shown in phantom). Otherwise, the tire stem may contact the disk or simply be rendered difficult to access to fill the tire. A variety of tire stem placements and shape are contemplated and should be within the contemplation of those of ordinary skill whereby interference from the disk can be avoided.

The center of the disk 162 includes a "drive hub" 230 according to an illustrative embodiment. The shape, size and underlying function of the drive hub is highly variable. In this embodiment, the drive hub 230 includes a pull-cord unit that allows the pull-cord to be rapidly paid out by grasping and drawing upon a cord handle 232 that projects from the side of the front wheel assembly. Upon pulling, a ratchet assembly (described further below) engages the disk as causes the disk to spin. The drive hub ratchet works in conjunction with a recoil unit that withdraws the cord after release. The ratchet allows free movement without engaging the disk in the withdrawal direction. It is expressly contemplated that the drive hub can comprise a variety of mechanisms that initiate a high-rpm spin-up of the disk.

Figure 2A:
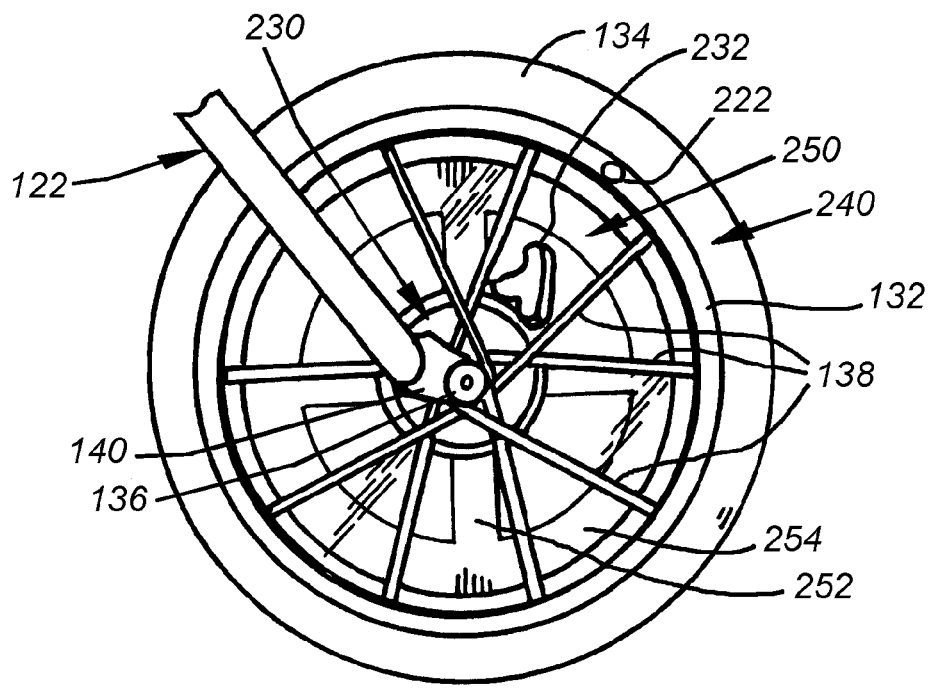
FIG. 2A is a fragmentary side view of a front wheel for the bicycle of FIG. 1 including the stabilizing system having a rotating mass according to another embodiment.
Figure 20:
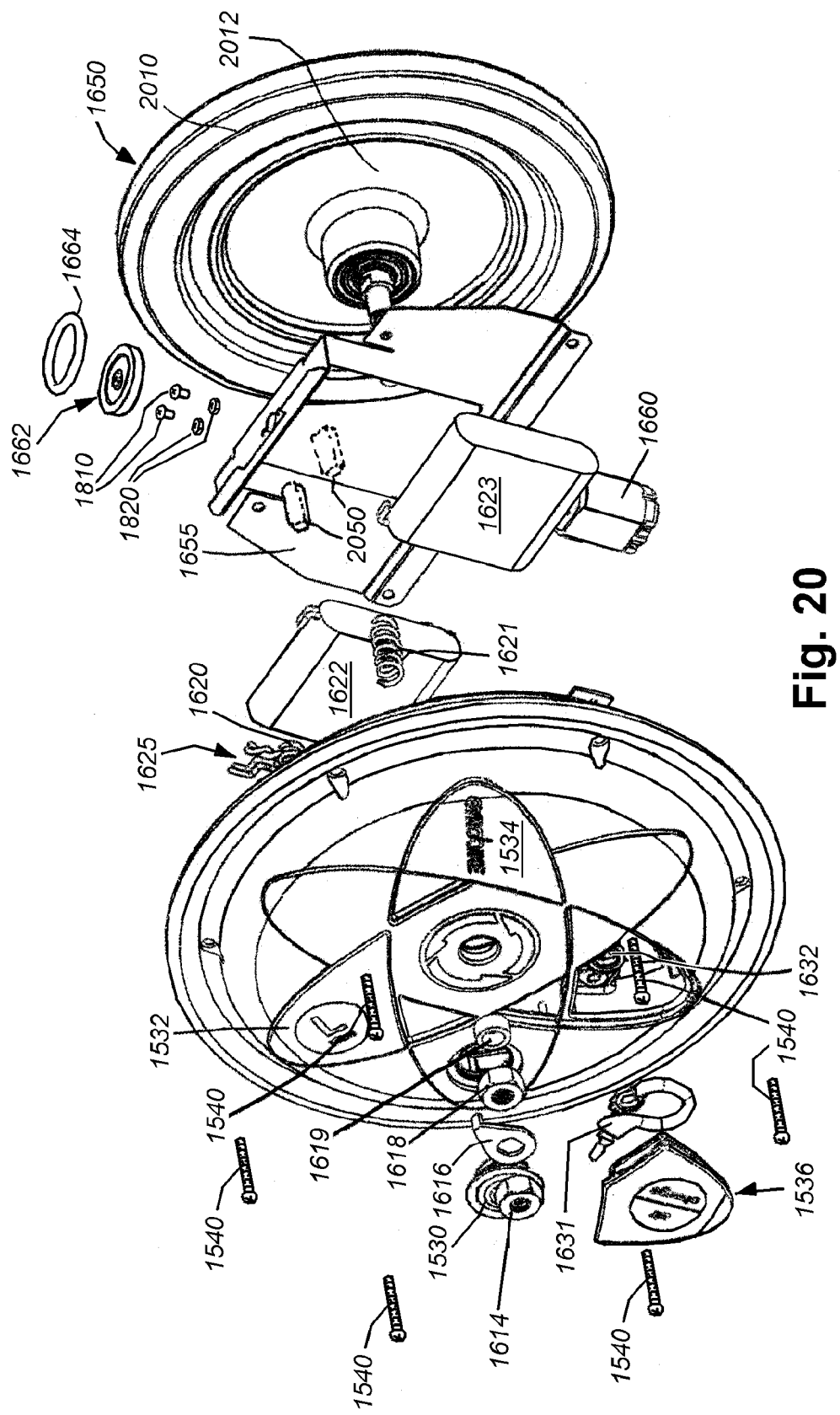
FIG. 20 is an exploded perspective view detailing the components as viewed from the back, of the wheel of FIG. 14.

FIG. 2A shows a wheel assembly 240 according to an alternate embodiment. As noted above, it is desirable the mass be concentrated along the outer perimeter of the wheel. Those of ordinary skill will recognize that the value for rotational moment of inertia (I, which equals mass m times the square of the radius, or $I=mr^2$) is optimized where more mass is concentrated at the outer perimeter of a rotating mass. Accordingly, FIG. 20 shows an embodiment of a rotating mass 250 with spokes, rather than a solid structure. The mass is concentrated in the outer perimeter region 254. In this manner overall weight of the disk (and hence the front of the bicycle) is reduced without substantially reducing I. In further embodiments, the mass can be concentrated in the perimeter of a solid disk by providing special weights (lead or steel billets for example) in an otherwise lightened solid disk constructed from, for example, aluminum or composite materials/polymers. Rotating masses need not define a continuous circular perimeter. In alternate embodiments, weight can be distributed in the mass at the ends of a plurality of separated arms, so long as the arms or perimeter structure is well balanced with respect to the central axis so as to avoid up-and-down wobble as the mass rotates within a gravitational field. For the purposes of this illustration, the first mass 162, shown in FIG. 2 can be constructed of steel with a thickness of approximately one inch (highly variable), a diameter DM of 14-15.5 inches (highly variable) and an evenly distributed total mass of approximately 13.5 pounds. The example of FIG. 2A the mass 250 is also constructed of steel with a thickness of about 1 inch. It also has an outer diameter DM of approximately 14-15.5 inches. In one experimental implementation, the total mass for this structure is approximately 12.3 pounds (a savings of more than a pound), and the I value is higher than the evenly distributed disk. By using heavier materials in combination with lighter composites the I-to-weight ratio for the mass can be optimized. In one example, the I value is in a general range of 210-240 pounds*$in^2$, but a wider range of values for moment of inertia are expressly contemplated.

Figure 3:
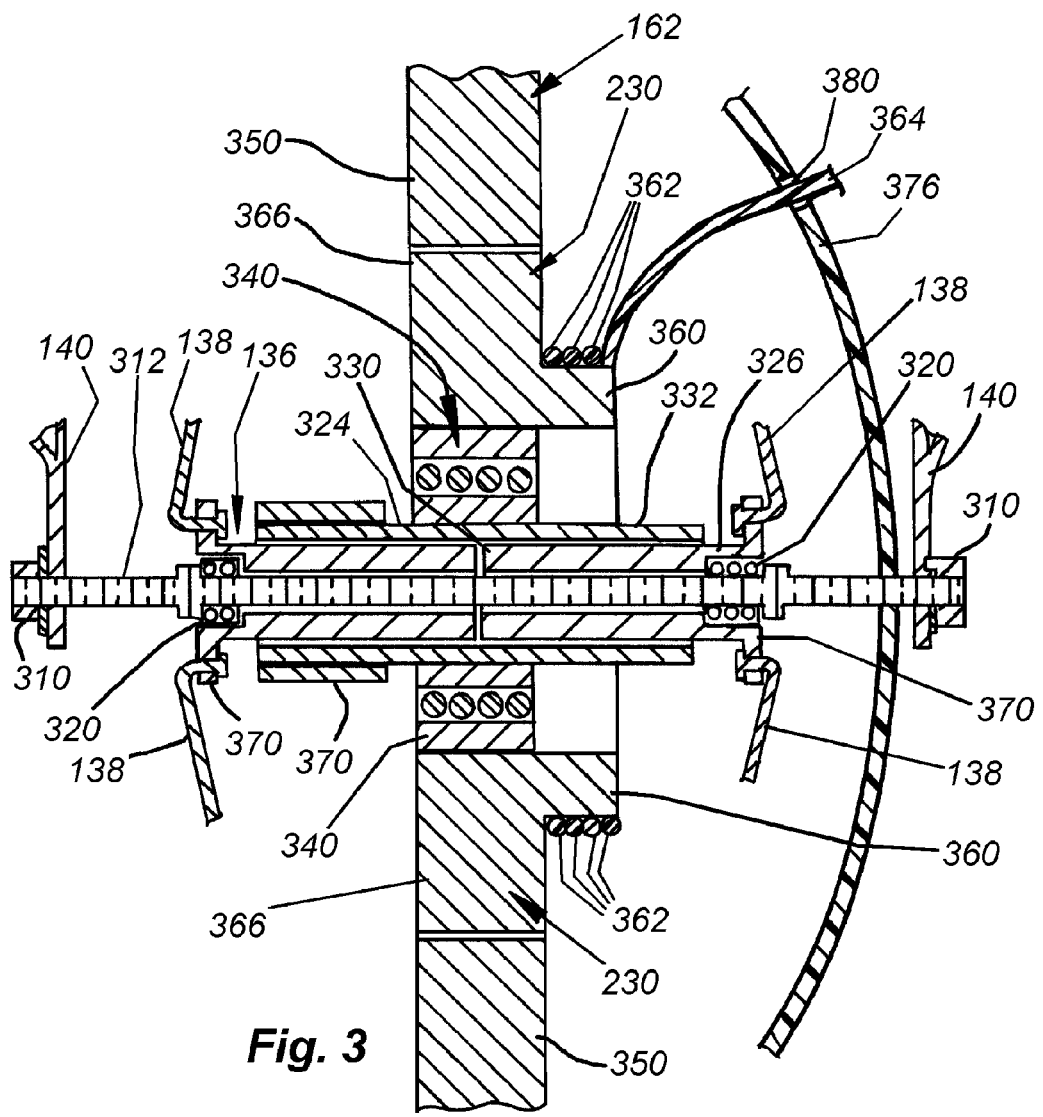
FIG. 3 is a cross section of the wheel and rotating mass according to either FIG. 2 or FIG. 2A.

FIG. 3 shows a cross section of the central region of a wheel assembly and mass 162 according to the embodiment of FIG. 2. The wheel assembly is mounted on the bottom fork ends 140 by a pair of nuts 310, which engage opposing ends of a threaded axle shaft 312. The axle shaft 312 conventionally supports the inner hub 136 on bearings 320. Note that the structure of the shaft 312 and inner hub 136 is highly variable. The main object is to provide a wheel that rotates relative to the front fork and a separate rotating mass that rotates freely with respect to both the wheel and the front fork so that the mass can rotate at a relatively high RPM so as to generate a gyroscopic effect even when the front wheel is barely moving or stationary. To accomplish this free rotation of the moving mass, the inner hub 136 has been divided into two pieces (or a plurality of sections) 324 and 326 with central break 330 therebetween, over which is placed a cylindrical sleeve 332 that forms a new joint between the separated inner hub sections 324, 326. This joint maintains the radial alignment of the sections 324, 326 and forms a bearing surface for the mass. The sleeve 332 can be secured to the outside of the hub sections 324, 326 using (for example) welds, fasteners adhesives or a press fit. The outer surface of the sleeve 332 receives a bearing 340 that is pressed into the mass' drive hub 230. The drive hub can be constructed from any durable metal (aluminum alloy, for example) or polymer/composite material. In this manner, the drive hub 230 rotates freely on is bearing with respect to the sleeve 332, and hence, the front wheel. The drive hub is secured to the radially outward portion 350 of the mass. This interconnection can be by press fit, fasteners, welds, adhesives or any other acceptable technique. Alternatively, the drive hub 230 and outer mass 350 can be formed unitarily from a single piece of formed, cast, molded, and/or machined material (with appropriate fillers, inserts and weights applied to the material where appropriate).

As shown clearly in FIG. 3, the drive hub includes a cylindrical extension 360 of reduced diameter with respect to the main drive hub portion 366 (that engages the outer mass 350). This extension 360 supports a wrapped cord 362 with a tail end 364 that exits the hub and engages the pull handle 232 shown in FIG. 2 above. The firm withdrawal of the cord causes a rapid spin up of the drive hub. A well-balanced mass with a good bearing may spin at high RPM for several minutes. In this embodiment, a spin RPM of approximately 250-400 RPM is sufficient to provide stability as will be described below.

An optional spacer 370 is provided to at least one side of the sleeve 332. This spacer assists in maintaining the drive hub axially centered on the sleeve. Alternate centering and fixing mechanisms are expressly contemplated. In addition, a conical or domed shield 376 is provided between the fork end 140 and spoke flange 370 as shown. While only one side is shown having a shield, this shield can be applied to both sides of the wheel assembly to protect the rider and others from the fast-rotating mass. The shield can be constructed from a durable polymer, such as polycarbonate. It can be transparent/translucent and can include various graphics and visual effects where appropriate. Likewise, the mass can be provided with graphical patterns that, in conjunction with the shield, may be used to create an entertaining effect when in motion. The shield 376 includes a port 380 through which the cord end 364 passes. This allows the user to pull the cord 364 while his or her hands are protected from contact with the mass.

Figure 4:
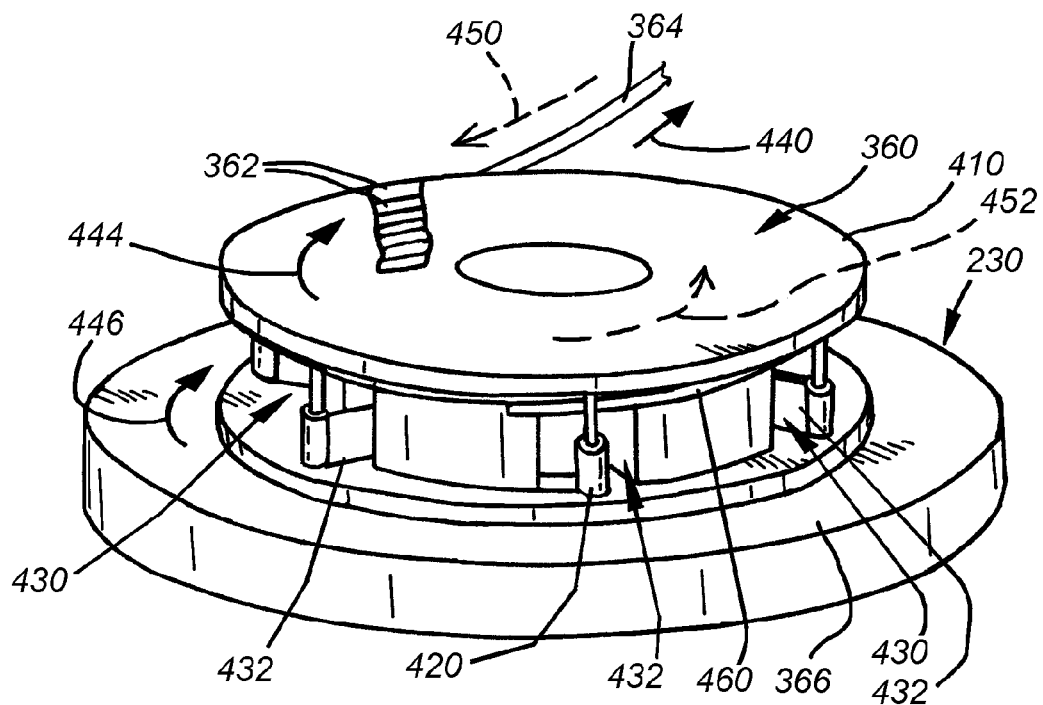
FIG. 4 is a partially exposed perspective view of a cord-pull, recoil-type mechanism for initiating rotation of the mass according to an embodiment of this invention.

With reference now to FIG. 4, a recoiling, cord-pull drive hub assembly 230 according to an illustrative embodiment of this invention is shown in further detail. It should be understood that the structure of this assembly is only exemplary. Those of ordinary skill should be familiar with this type of rotation-inducing mechanism as it is substantially similar to those found in the pull starters of small engines. The drive hub 230 includes the above-described larger-diameter main portion 366 and a smaller diameter projecting cylinder. This cylinder is actually an outer reel that rotates with respect to the main portion and a fixedly attached inner ratchet base 420.

The ratchet base includes a series of radial grooves 430 that selectively engage spring loaded pawls attached to the reel 410 when the cord end 364 is pulled outwardly (arrow 440). That is, the pawls 432 lock into the grooves 430 when the cord is pulled, causing the reel to rotate (curved arrow 444) and the main portion 366 to also rotate (curved arrow 446). However, the reel 410 includes a spring assembly 460 that is unwound by the pulling of the cord, and that rewinds to relieve tension, thereby drawing the cord back into a wound position (dashed arrow 450). The pawls 432 disengage for the ratchet bases 430 in this direction reverse to allow rewind to occur (dashed curved arrow 452). Likewise, the disengaged pawls allows the reel to be free from rotation while the mass spins at high speed (thus, no reverse dashed arrow on the main portion 366 is shown).

Figure 5:
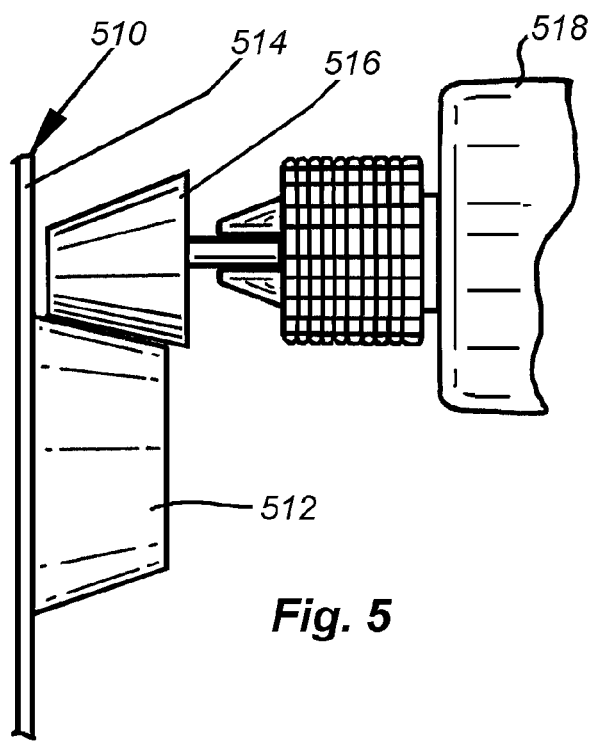
FIG. 5 is a fragmentary side view of an electrical device-driven mechanism for initiating rotation of the mass according to another embodiment of this invention.

As noted above, the spin-up mechanism for the mass is widely variable. One alternate mechanism is shown in FIG. 5. Simply, the drive hub 510 includes an extension 512 from the main portion 514 that is frustoconical in shape. This allows firm engagement with a frustoconical tip 516 of an electrically driven device, such as the illustrated cordless drill 518. The tip can be a hard rubber or other elastomer to firmly engage the extension 512. By simply inserting the drill tip 516 through a hole in the shield (described above), the tip contacts the extension 512 and spins it once power is applied. In practice, the tip 516 can be provided as part of the kit a user receives with the bicycle and/or accessory wheel assembly of this invention.

Figure 5A:
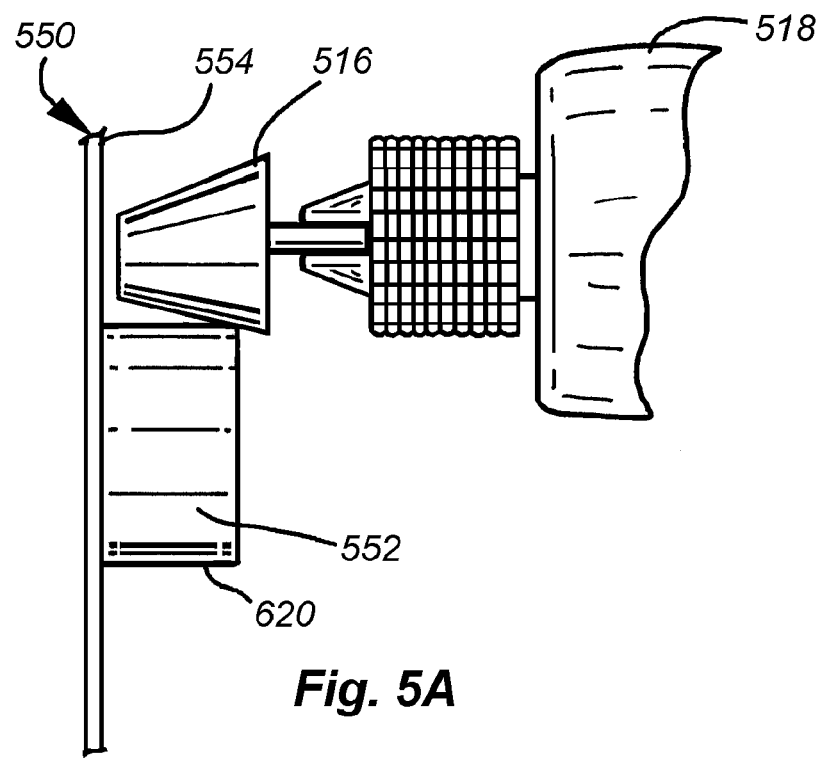
FIG. 5A is a fragmentary side view of the electrical device-driven mechanism of FIG. 5 with an alternative drive hub design according to another embodiment of this invention.

FIG. 5A shows a slightly modified drive hub 550 with a main portion 554, in which the same frustoconical tip 516 (as FIG. 5) drives a straight-cylindrical extension 552. The corner 620 of the cylinder may assist in providing engagement between the tip and extension. A variety of tip shapes, extension shapes, materials and surface textures are expressly contemplated.

Figure 6:
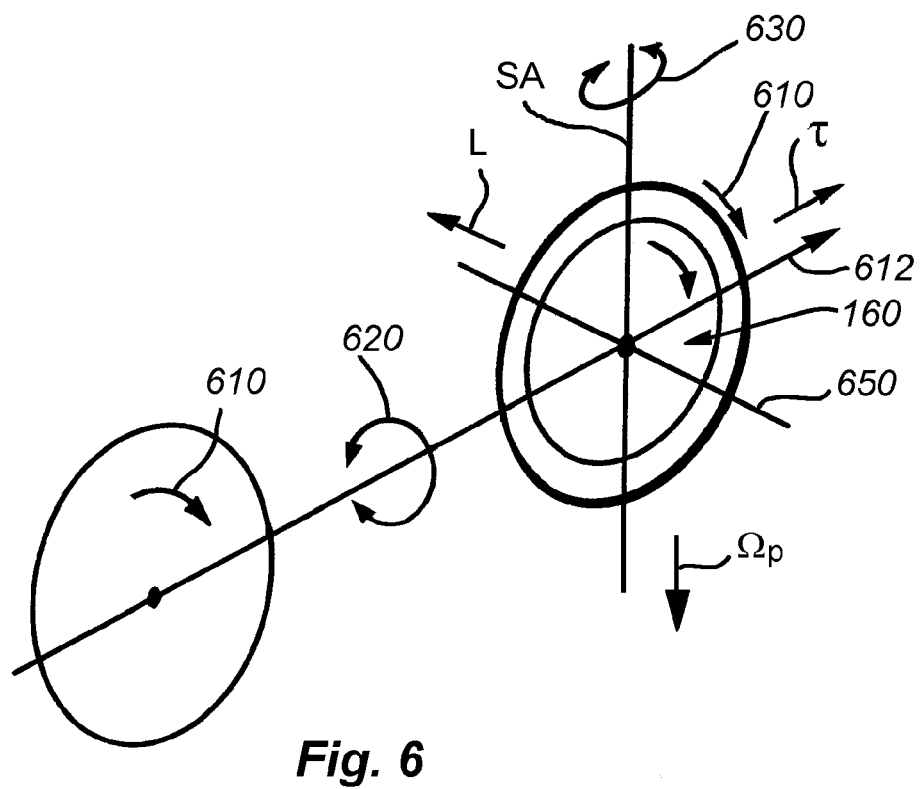
FIG. 6 is a schematic diagram showing the various rotations and axes of interest on a bicycle in connection with this invention.
Figure 7:
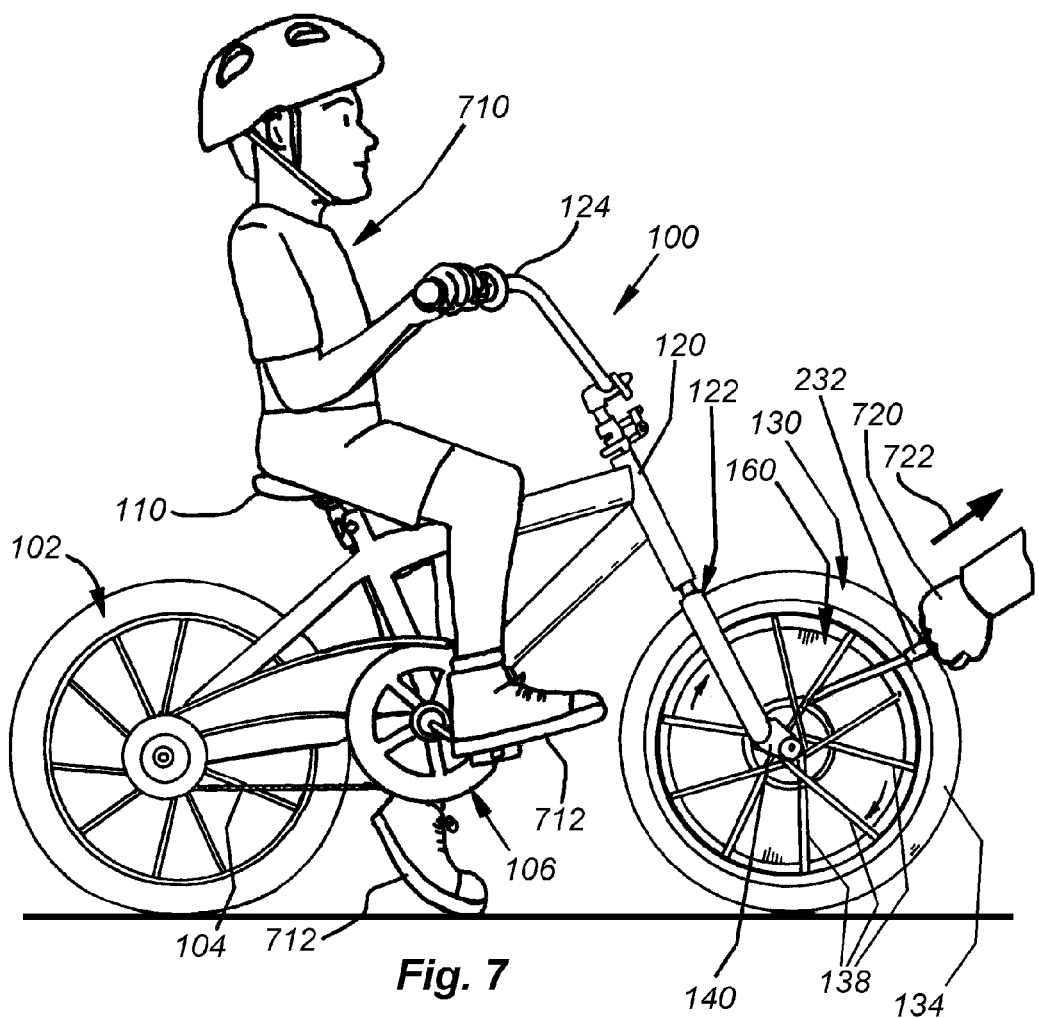
FIG. 7 is a side view of a bicycle and rider in a starting position employing the system and method of this invention.
Figure 11:
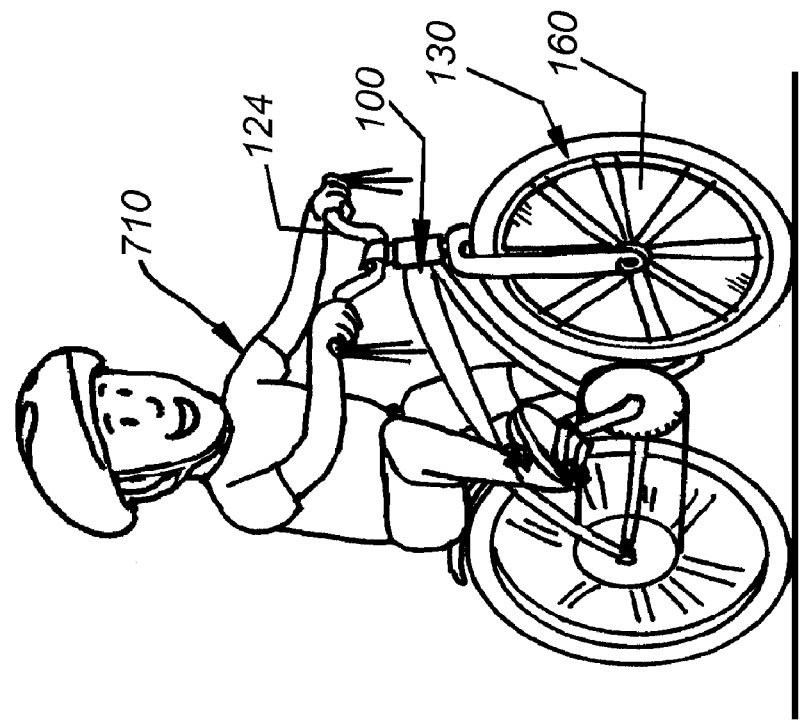
FIG. 11 is an on-angle view of the bicycle and rider of FIG. 7 showing the recovery from the imbalance due to the steering of FIG. 10.

Having described the structure of an exemplary system for gyroscopically stabilizing a front wheel of a bicycle, the function of the system is now described in further detail. Referring to FIG. 6, the dynamic forces of interest are as follows:

Rotation of the wheels (curved arrows 610) translates into forward velocity along longitudinal axis 612 (when running with a straightened front wheel). Banking generally about the longitudinal axis (actually about wheel-to-ground contact points) is shown as curved arrow 620. The front wheel steers (curved arrow 630) about the above-described steering axis SA.

The mass 160 rotates about the front wheel axis 650, thereby generating a characteristic angular momentum L (where L=I$\omega$, in which $\omega$ is the angular velocity of the rotating mass). The banking rotation represents a torque $\tau$ generally about the longitudinal axis 612. Where angular momentum and torque cross, a precession is generated. This precession is the property whereby a gyroscope rotates at a predetermined magnitude in response to crossed forces. In this case the precession $\Omega_P$ is characterized by the equation:

$$\tau = \Omega_P \times L.$$

In other words, the equation governing precession is derived from the fact that torque equals the angular velocity of precession crossed with the angular momentum. Hence, a torque on a gyroscope (such as the torque from a child falling in an excessive or unintentional bank or tilt about the longitudinal axis) is transferred 90 degrees, and results in precession. For example, if the child were to tip to the right, the wheel would simply turn to the right. This allows the weight of the child to be re-centered over the front wheel. It is particularly desired that precession ($\Omega_P$) be small in order so as to produce a relatively smooth recovery for the bicycle wheel. Since precession is inversely proportional to angular momentum a large I value, produces a relatively small precession for a given applied torque.

Reference is now made to the exemplary rider-training session of FIGS. 7-11. The process begins with the rider 710 seated atop the bicycle 100, grasping the handlebars 124 in forward-steering position, with feet 712 prepared to begin pedaling. The helper places a grasping hand 720 on the pull-cord handle 232 and rapidly draws it (arrow 722) to spin the mass 160. After spin-up, the rider 710 begins to pedal.

In FIG. 8, the rider 710 experiences and imbalance (arrow 810) that may lead to an unintentional/undesired bank or tilt. This bank occurs in FIG. 9, in which the bicycle leans (arrow 910) over, threatening to eject the rider 710.

Figure 10:
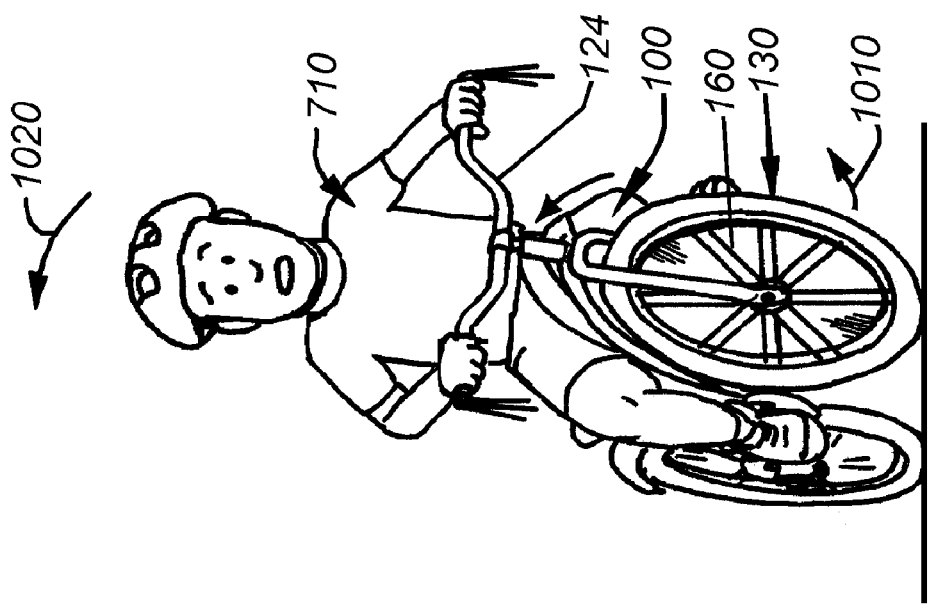
FIG. 10 is a front view of the bicycle and rider of FIG. 7 in which the unintentional bank or tilt of FIG. 9 is being compensated by precession of the rotating mass to cause the rider to gently steer into the bank.

As shown in FIG. 10, due to the precession generated by the spinning mass 160, the front wheel 130 turns smoothly (arrow 1010) in the direction of the unintentional bank, causing the handlebars 124 to be firmly urged to "steer-into" the bank. Thus the rider 710 experiences a turn that causes the bicycle 100 to begin to right itself (arrow 1020). Finally, in FIG. 11, the turn, induced by the imbalance and bank is complete and the rider 710 is riding vertically again in a new direction. The act of banking the bicycle has lead to a conventional turn, without jackknifing the bicycle or causing it to tip over, thus emulating a natural motion of banking and turning, even at relatively low speeds. This allows the young, slowly moving rider to learn the dynamics associated with faster riding, while maintaining a slower, safer speed.

Figure 12:
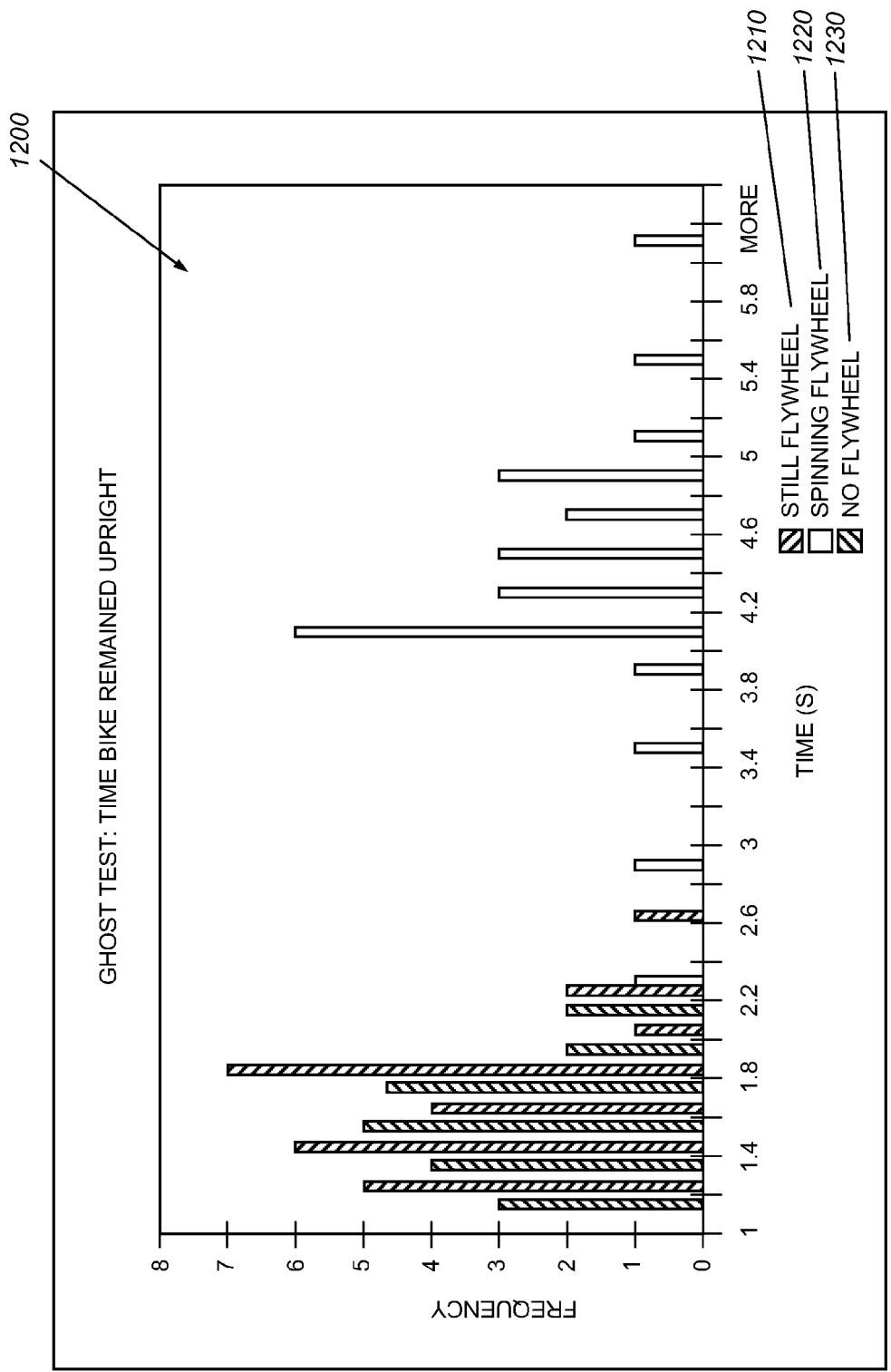
FIG. 12 is a graph comparing experimental data of upright travel (without rider) for the same bicycle with no rotating mass, a still mass and a properly rotating mass.

To further prove the effectiveness of the stabilizing system of this invention a series of tests were performed with the approximate results shown in FIG. 12. A bicycle was launched, riderless (e.g. a "ghost" test) along a relatively flat path by hand at a relatively slow speed. Data bars for a non-moving mass (1210) show an upright time duration (before falling over) of approximately 1.2-2.2 seconds. Results are roughly similar for a bicycle with no mass installed (1230). Conversely, a bicycle with a mass moving at 200-400 RPM (1220) shows markedly increased upright time of approximately 2.3-6 seconds, with most times falling into the 4-5 second range (more than double the non-stabilized times).

Figure 13:
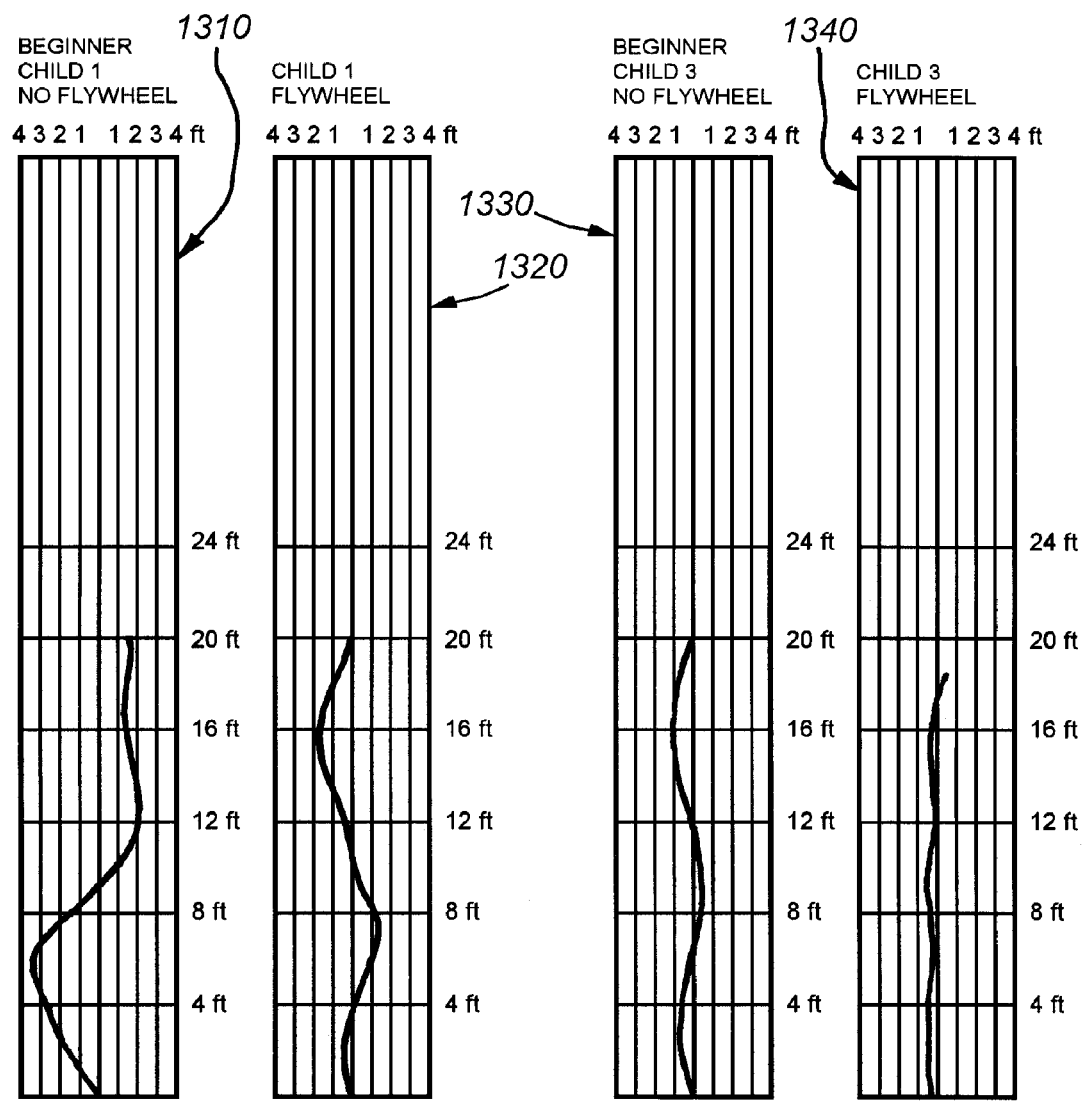
FIG. 13 is a graph comparing experimental data of travel path (with two different riders) for the same bicycle with no rotating mass, and a properly rotating mass.

Similarly, FIG. 13 shows comparative graphs 1310 and 1320, 1330 and 1340 for two respective test subjects, both relatively inexperienced juvenile riders. The graphs show the length of path traveled versus diversion from a straight path (both in feet). In both cases the graph for the bicycle without spinning mass (1310 and 1330) displays a higher amplitude from a straight line than the graphs for the bicycle with properly spinning mass (1320 and 1340).

Figure 14:
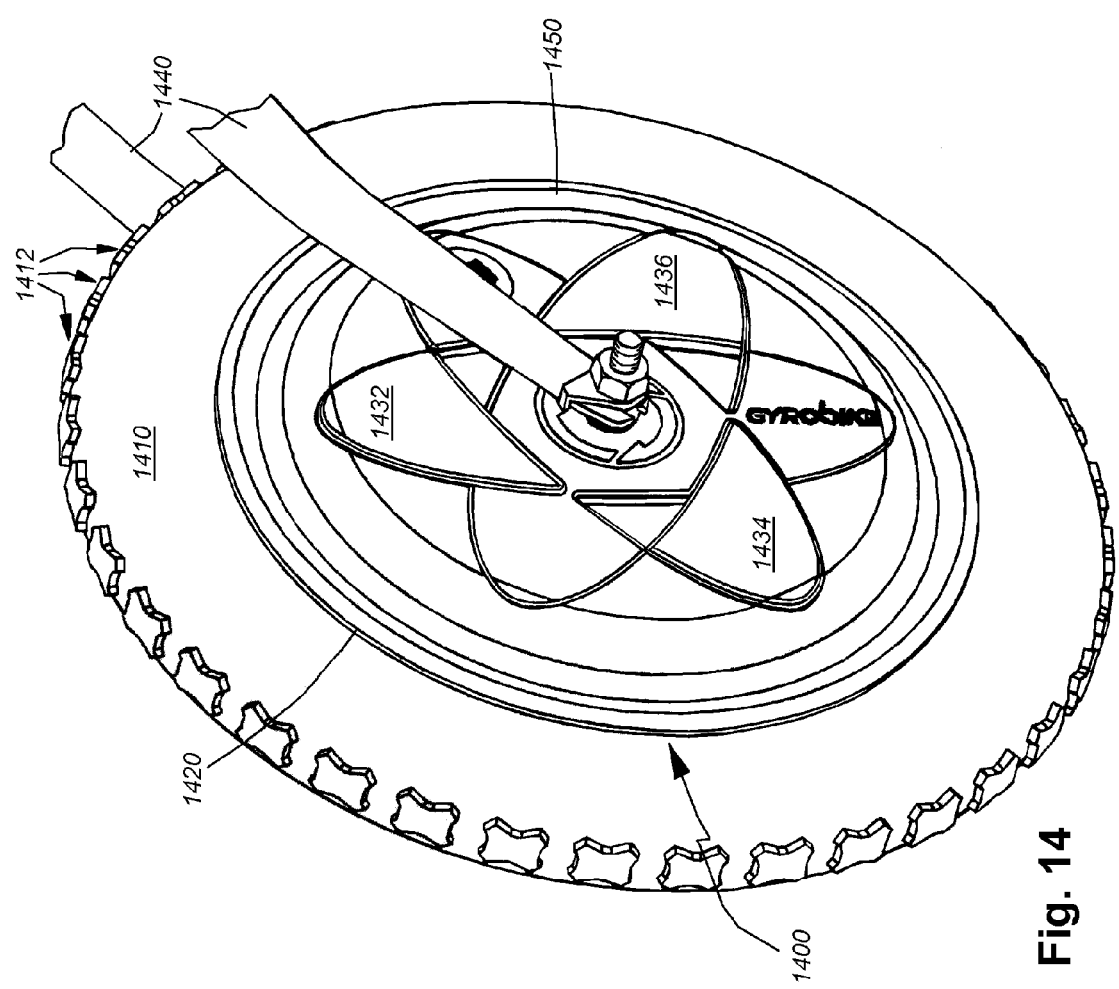
FIG. 14 is a right perspective view of a wheel for a wheeled vehicle with a stabilizing system having a flywheel according to an illustrative embodiment of this invention, shown mounted on an exemplary steering fork of a vehicle.

Reference is now made to FIGS. 14-20, detailing a wheel assembly 1400 according to another embodiment implementing a flywheel assembly and including an internal drive wheel and electric motor. FIG. 14 is a right perspective view of a wheel assembly 1400, constructed and arranged to be mounted on a conventional inner-tube tire 1410 having via a supporting rim 1420. The wheel assembly 1400 is rotatably mounted on the lower end of a fork assembly 1440 of a wheeled vehicle (not shown), having a conventional frame for a wheeled vehicle extending from the vehicle fork assembly 1440. The wheel assembly 1400 includes a front outer shell 1450 and an opposing back outer shell 1550 (shown in FIG. 15). The tire 1410 can include conventional tire tread 1412 to provide fraction for the wheeled vehicle. As used herein the terms "front" and "back" should be taken as conventions only, rather than absolute indications of orientation or direction. They are herein chosen with reference to the field of view in FIG. 14. Likewise, the terms "left" and "right" with respect to the wheel assembly can be substituted and are used as conventions only. In general, the terms "first shell" and "second shell" can also be employed for each of the engaging shell halves that make up the overall assembled wheel assembly shell/enclosure.

The front outer shell 1450 includes a plurality of removably mounted cover plates 1432, 1434 and 1436. Each of the cover plates are removably secured, or cemented to the front outer shell 1450. Where removably secured, they can provide access to the components, features, and other aspects of the wheel assembly 1400 and flywheel assembly. The cover plates can be constructed from a transparent or translucent material and can be co-molded with the surrounding opaque material of the shell. Alternatively, the entire shell can be transparent or translucent and selectively painted or dyed to make some portions opaque. Transparent or translucent regions on the shell, as described below, are used to allow viewing of the spinning flywheel and/or other internal components for a dynamic, ornamental effect. As depicted the flywheel includes a number of circles (1750 in FIG. 17), that can be representative of a polka dot graphic. A variety of other graphics, such as spiral can be employed on the visible surface of the flywheel. The cover plates can alternatively provide access to recessed compartments for containing items within the wheel, such as tools, or other appropriate items. The front outer shell 1450 and/or cover plates 1432, 1434 and 1436 can be formed of a polymer, stamped metal or other equivalent materials that can be translucent or transparent so as to reveal the flywheel assembly components and internal wheel assembly components. The front outer shell 1450 and cover plates 1432, 1434, 1436, can thereby reveal, for example, a graphic displayed on the flywheel assembly, or can alternatively be color-tinted or otherwise decorated so as to provide a visually appealing wheel. (See polka dot graphic 1750 shown in FIG. 17, for example).

Figure 15:
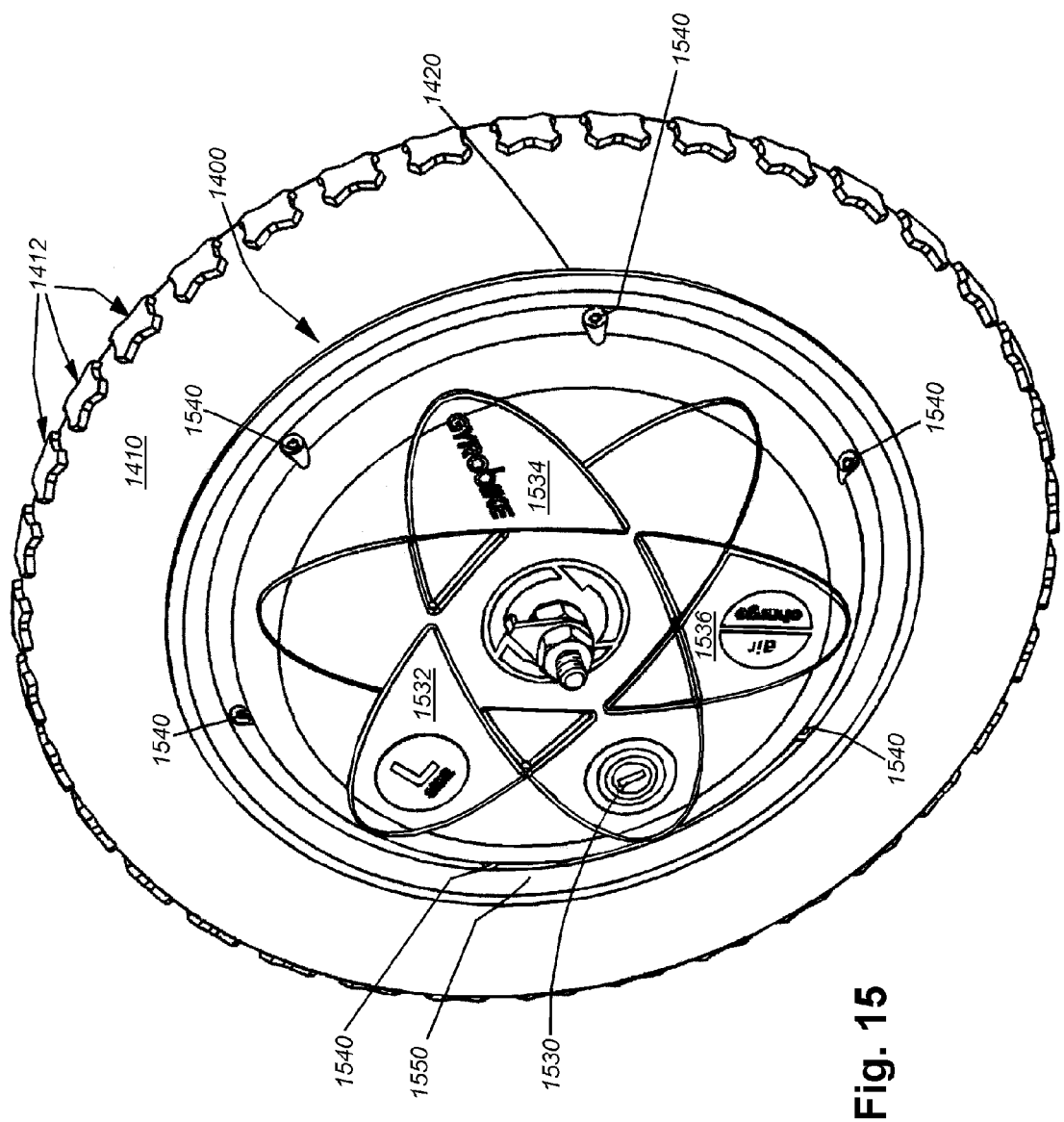
FIG. 15 is a left perspective view of the wheel of FIG. 14, shown with the vehicle fork omitted.

FIG. 15 shows a left side view of the wheel assembly 1400 having a back outer shell 1550. The back outer shell 1550 includes cover plates 1532, 1534 and 1536 that are each removably secured to the rear outer shell, so that the internal components and other features of the wheel assembly are readily accessible. For example, the rear cover plate 1536, which can be opaque, and constructed from a resilient material, removably covers an access port for the tire inner tube's air valve stem (1670 shown in FIGS. 16 and 17) and the data (diagnostic) and battery charging plug (1632 in FIGS. 16 and 17).

The back outer shell 1550 further includes a push button 1530 that is used in an illustrative embodiment to turn on and off the flywheel's electric drive motor and/or to alternate the speed of the motor. In alternate embodiments, the push button 1530 can be replaced with a remotely actuated button that is located, for example, on the handlebars or other frame location of the wheeled vehicle. In an embodiment, the button can signal the motor controller to select one of a plurality of spin speeds—for example by multiply pressing the button within a certain time interval. In this case, the remote button sends a wireless signal to the electric motor notifying that it should activate and commence spinning the internal drive wheel, and further selects the speed.

The front outer shell 1450 and rear outer shell 1550 are secured together via appropriate fasteners 1540, such as screws that can be threadedly secured within the outer shells to secure the shells together. Accordingly, the wheel assembly 1400 is then provided as a solitary item that is placed within the rim 1420 of the tire 1410 to provide stabilization to the (steerable) wheel, also thereby stabilizing the wheeled vehicle itself.

Figure 16:
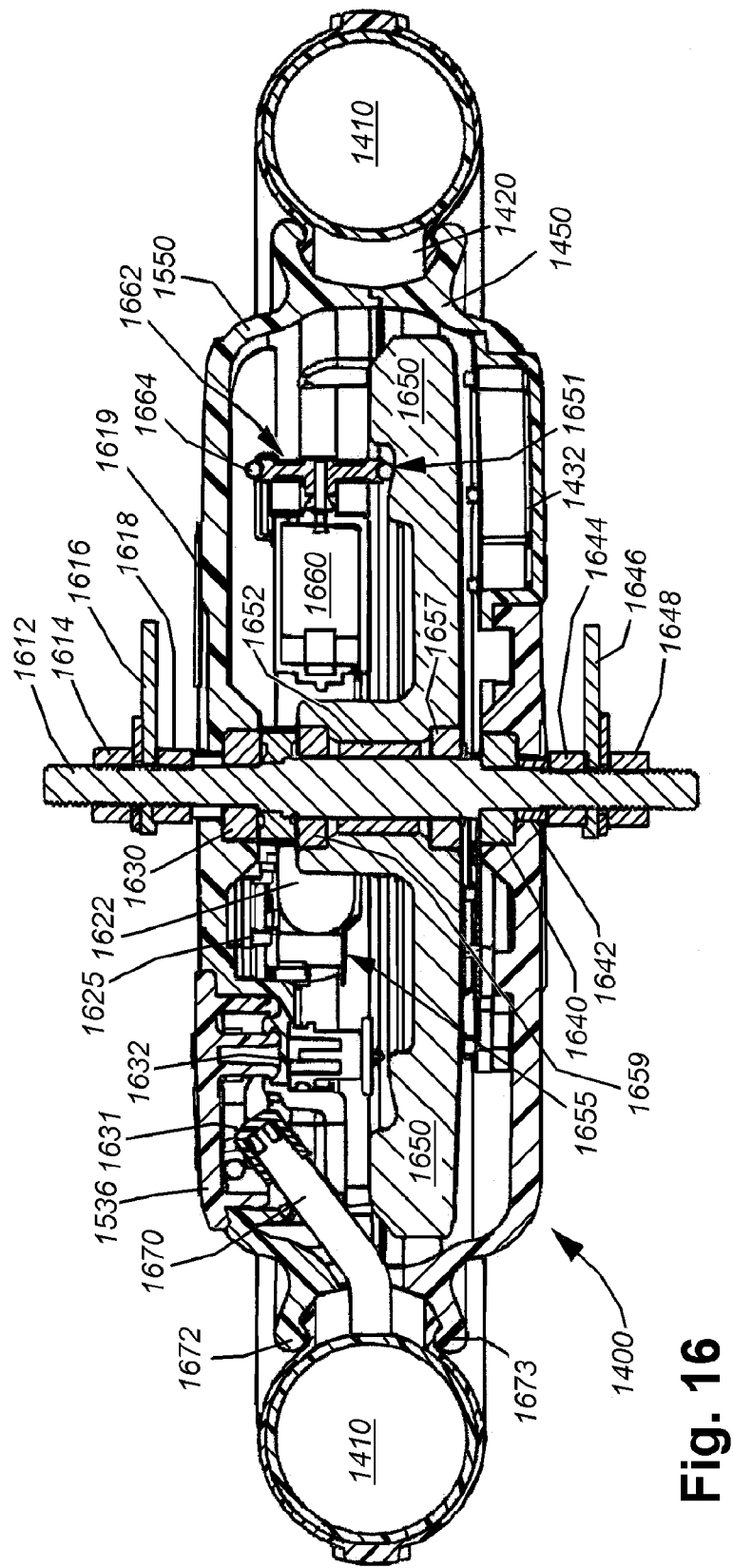
FIG. 16 is a cross-sectional view further detailing the interior components of the wheel of to FIG. 14.

Reference is now made to FIG. 16, a cross-sectional view detailing the internal components of the wheel assembly 1400 and the flywheel assembly 1650. As shown, the front outer shell 1450 and back outer shell 1550 snap-fit together to secure the wheel assembly 1400 together. The front outer shell 1450 and the back outer shell 1550 each define one half of a conventional rim geometry with opposing circumferential flanges 1672, 1673 that are constructed and arranged to engage and capture the confronting bead of a conventional tire (1410) when the two shells are secured together by snap-fit so as to nest into a clamshell arrangement as shown. The flywheel assembly has at its center an inner hub 1652 that is supported within the wheel by an inner axle 1612 on bearings 1657 and 1659. The various wheel assembly components and flywheel assembly components are secured axially within the front outer shell 1450 and rear outer shell 1550 by nuts 1614 and 1618 that also secure each outer shell within the axle and generally maintain the relative axial spacing between components in the clamshell. Also shown is fork lock 1616 to secure the axle to the fork (1440) of the wheeled vehicle (fork is not shown in FIG. 16).

The rear outer shell 1550 is supported on the axle 1612 via bearings 1619 and 1630. These bearings allow for free rotation of the axially aligned components including the outer shells and corresponding securing nuts with respect to the rotationally fixed inner axle 1612. Similarly to the rear outer shell 1550, the front outer shell 1450 includes bearings 1640 and 1642 that provide for free rotation of the axially aligned components. Also shown are nuts 1644 and 1648 that secure the components within the wheel assembly 1400, and the fork lock 1646 that secures the wheel assembly 1400 to the fork of the wheeled vehicle.

Figure 17:
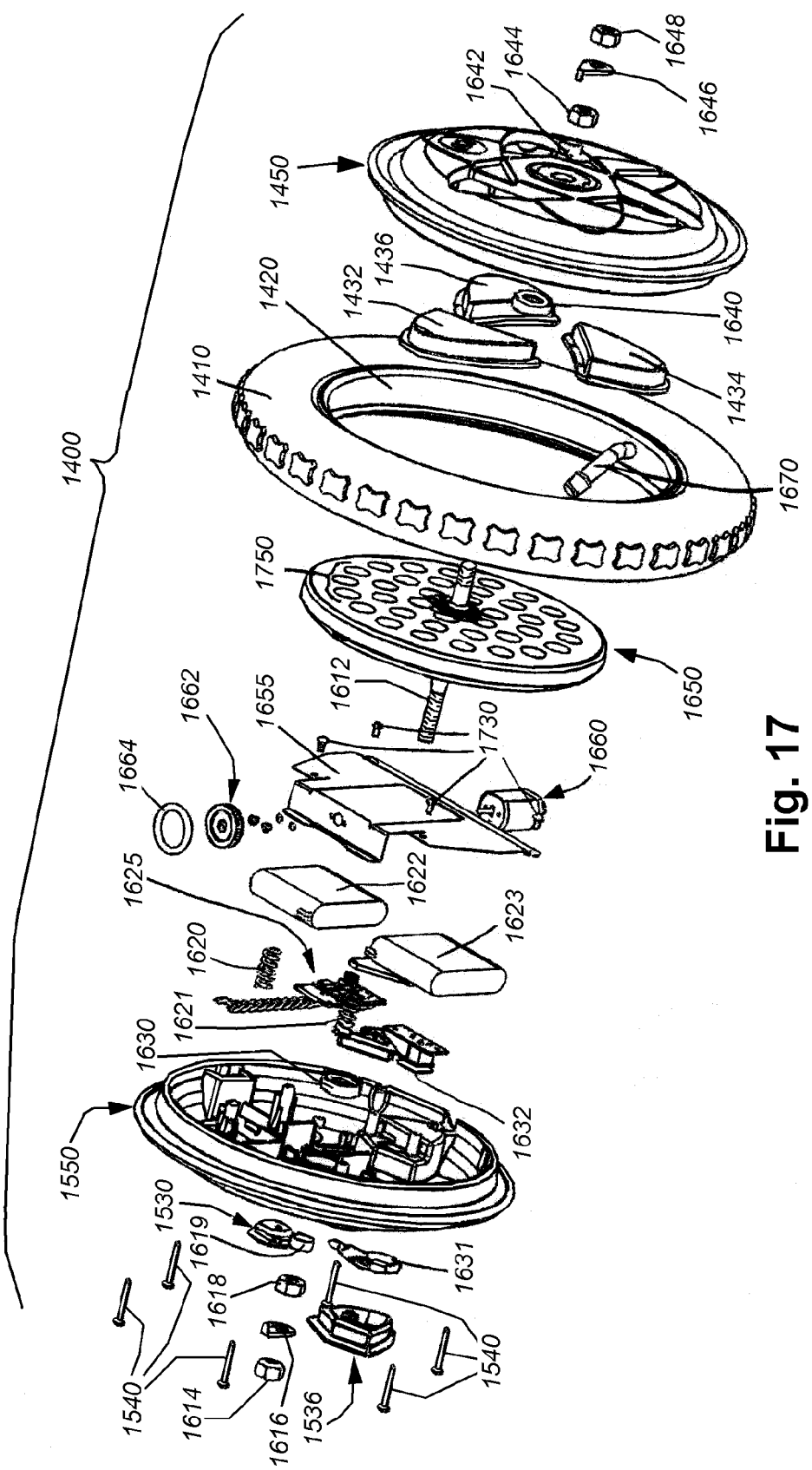
FIG. 17 is an exploded perspective view detailing the components of the wheel of FIG. 14.

As shown in FIGS. 16 and 17, there is provided an electric motor 1660 that rotates an internal drive wheel 1662 having a groove-seated driving tire (for example an O-ring 1664) that engages the surface of the flywheel 1650 at contact point 1651 located radially near the flywheel's outer perimeter edge. As shown in FIG. 17, there are provided compression (coil) springs 1620 and 1621 that bias the motor mount bracket 1655 so that the drive wheel 1662 is, in turn, biased against the flywheel 1650 to ensure the drive wheel 1662 causes the flywheel 1650 to rotate. As used herein the term "flywheel" should be taken broadly to define any type of unitary, multi-piece or other structure (broadly, a rotating mass) that rotates in a manner that generates a gyroscopic effect. The springs 1620 and 1621 are also provided to allow the contact between the flywheel 1650 and the internal driven wheel 1662 to constant, yet not a rigid point of contact, but rather a flexible/resilient contact. In this manner, there is a certain amount of play between the components, so as to prevent burnout of the motor from, for example, sudden motor acceleration/deceleration due to a hard bump, unexpected inconsistency in the flywheel geometry and/or surface shape, or other instances where the flywheel and internal driven wheel require slight adjustment and modification for movements.

In an illustrative embodiment, the electric motor 1660 operates at least at three rotational speeds, including low, medium, and high speeds. In alternate embodiments, the electric motor can be constructed and arranged to vary the degree of gyroscopic stability that results from the spinning of the flywheel by adjusting the rotational speed of the electric motor accordingly. In an illustrative embodiment, the low speed is at approximately 800 revolutions per minute, the medium speed is at approximately 1200 revolutions per minute and the high speed is approximately 2000 revolutions per minute. The exact number of revolutions per minute and speed of the electric motor is highly variable and these exemplary numbers are merely provided for illustrative purposes. The particular rotational speed of the electric motor is variable, so long as it provides the desired degree of rotation of the flywheel 1650 within the wheel assembly. More particularly, the electric motor can operate at a variety of input voltage ranges, and define a variety of maximum speed and/or torque ratings.

In an illustrative embodiment, the flywheel 1650 is comprised of steel, and as shown in FIG. 20, can have a structure such that the majority of the mass (and thus weight) of the flywheel is at the exterior portions of the flywheel 1650, thereby further improving operation of the wheel assembly. This will be described with respect to FIG. 20 below.

In an alternate embodiment, a regenerative system can be implemented. In general, once the internal drive wheel 1662 has caused the flywheel to accelerate to a desired rotational speed, it does not require as substantial continuing power input to maintain a predetermined rotational speed due to inherent inertia and the lowered friction provided by the bearings (1657, 1659). Accordingly, the motor may be pulsed on and off to conserve energy. Moreover, the motor control can be constructed and arranged to connect the batteries as a load on the motor after the system is shut off. In this manner, the motor can act as an electric brake, and recharge the batteries with the stored energy from the flywheel in a regenerative arrangement. Thus, the significant energy expended in accelerating the flywheel to a desired speed can be largely recovered during deceleration, and the less-significant energy needed to maintain a given rotational speed translates into a longer run time on a given battery charge.

A pair of batteries 1622 and 1623 (1623 not shown in FIG. 16 cross-section) are located within the wheel in this embodiment. They provide sufficient power for the electric motor 1660 to spin-up and maintain rotation of the flywheel assembly for a predetermined time period. As shown in FIG. 17, the batteries are disposed between the motor mount bracket 1655 and the rear outer shell 1550 on opposing sides of the wheel assembly 1400 so as to provide the power to run the system. It is noted that the batteries are compact and appropriately sized so as to not interfere with the operation of the flywheel assembly in providing stabilization to the wheeled vehicle. The batteries can be constructed using Lithium Polymer, Nickel Metal Hydride, Nickel Cadmium, or any other acceptable battery technology. Alternatively, disposable batteries can be employed, with appropriate access ports in the structure to allow replacement thereof. In further embodiments, micro fuel cells or capacitors can be used to store electricity. The batteries are operatively connected to a control circuitry 1625 shown in FIGS. 16, 17 and 18 that controls the speed of the electric motor 1660. The control circuitry can be constructed on a single, application specific circuit chip, or from discrete electronic components, on a circuit board, using conventional circuit design techniques and components. In an embodiment is defines a microprocessor or microcontroller with a storage memory (onboard FLASH, for example) for storing operational firmware that can be reprogrammed when appropriate. Separate or integrated motor control circuitry can also be provided so as to vary the power applied to the drive motor. Such circuitry can be implemented in accordance with conventional electronic design principles. The motor can be implemented as a standard DC or AC motor (typically using rare earth magnets for enhanced torque and speed), or can be a motor including onboard feedback capabilities, such as an integral encoder, and/or a stepper arrangement. The control circuitry is illustratively adapted to operate the given type of motor employed herein.

The control circuitry 1625 controls the various speeds of the electric motor 1660, as discussed hereinabove. Alternatively, the control circuitry can send (via a feedback loop) the appropriate signals to the electric motor to control the drive wheel based upon the speed at which the flywheel assembly is rotating so as to control power consumption. The various modes of the batteries and charging system of the wheel assembly are discussed in greater detail hereinbelow with reference to the motor control procedure and various modes of the system.

Figure 18:
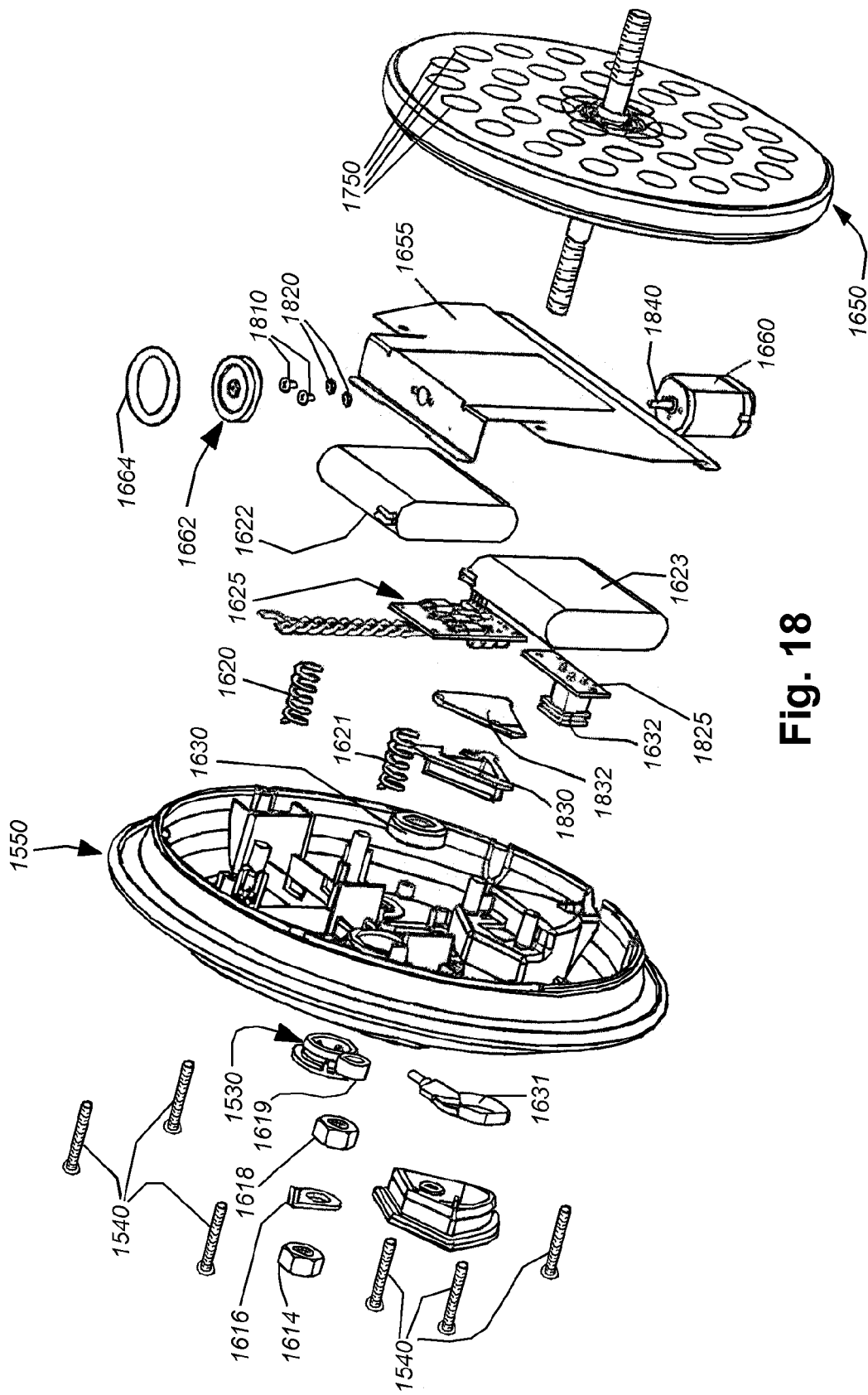
FIG. 18 is a more-detailed exploded perspective view of the charging system and driving components of the wheel of FIG. 14.

Also shown in FIG. 16, and more particularly in FIGS. 18 and 20, there is provided an optional lanyard 1631 prevents the back cover plate 1536 from becoming discarded with respect to the back outer shell 1550 when the cover plate is removed from the shell to access the charging and/or data plug 1632. The charging and data plug 1632 is used for charging the batteries, and alternatively can be used for downloading to and/or uploading data from the control circuitry 1625, for obtaining data relating to operation of the wheel assembly, providing updates to control circuitry software, and/or for controlling the flywheel assembly speed of rotation. In one exemplary embodiment, data regarding the stability of a rider can be uploaded to a portable device, such as a laptop computer, PDA or Apple iPod player. This data can allow an interested party (parent for example) to analyze and report on a riders learning progress. The data connector herein can be supplemented with or substituted for a wireless transceiver that employs, for example, the Bluetooth®, or similar communication standard.

Figure 19:
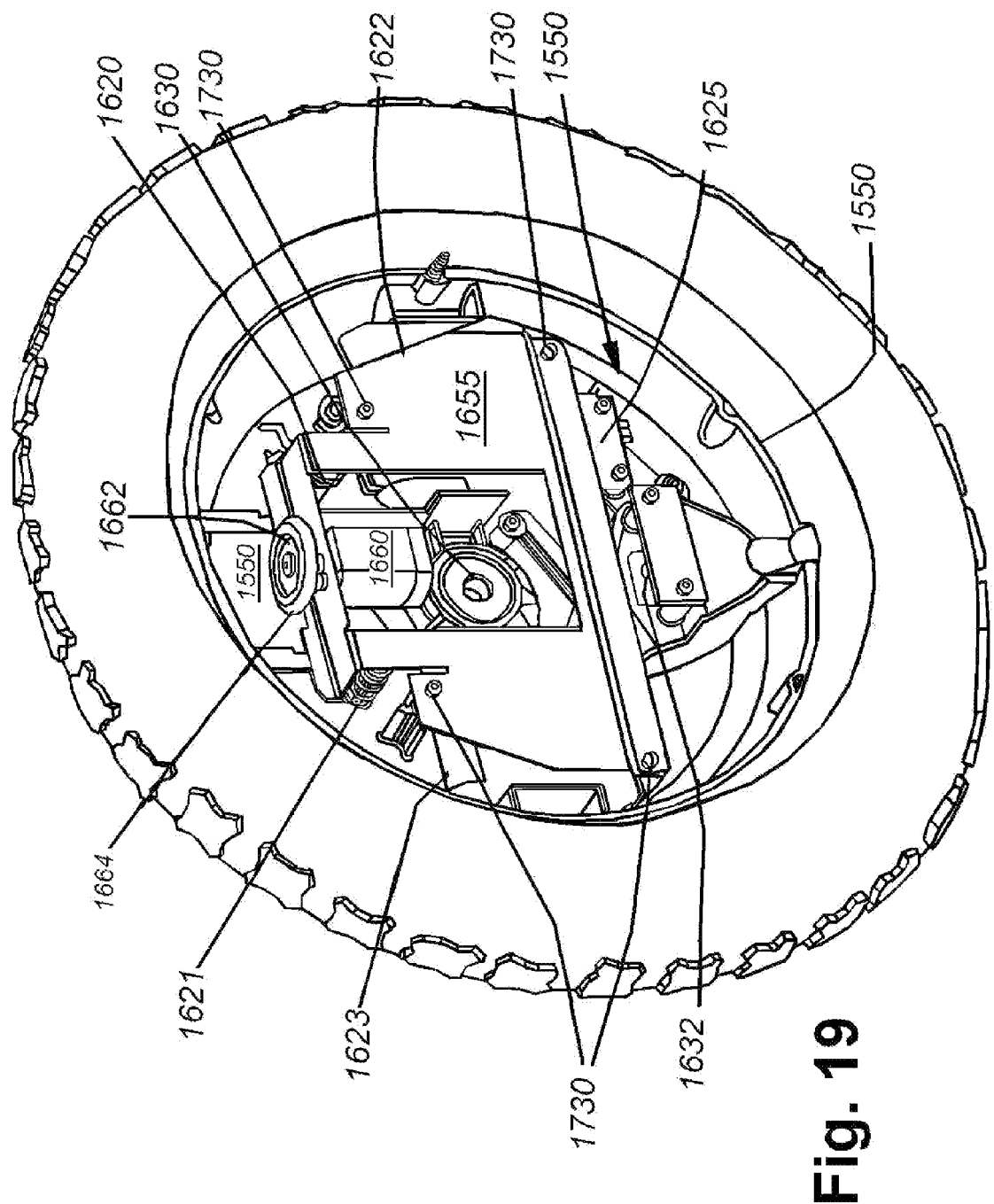
FIG. 19 is a partially exposed perspective view of the flywheel drive motor and motor mount shield of the wheel of FIG. 14.

Reference is now made to FIGS. 18 and 19 which further detail the electric motor and motor mount assembly. FIG. 18 further details the exploded front view of the flywheel assembly 1650 and internal components of the wheel assembly 1400. As shown, the electric motor 1660 has an internal drive wheel 1662, and corresponding drive tire (O-ring 1664), secured thereto by screws 1810 and respective washers 1820. The electric motor 1660 includes a drive shaft 1840 onto which the internal drive wheel 1662 is placed to cause the drive wheel to rotate. The assembled electric motor and internal drive wheel configuration, disposed within the motor mount bracket 1655, is shown in FIG. 19. Also shown in FIG. 17, the motor mount bracket 1655 is secured to the back outer shell 1550 by screws 1730. These screws 1730 are shown in FIG. 19 as securing the motor mount bracket 1655 to the rear outer shell 1550. A variety of alternate fastening systems (rivets, welds, etc.) and/or alternate mounting arrangements can be employed in alternate embodiments.

Further shown in FIG. 18 is the electrical connector securing bracket 1830 and plate member 1832 for securing the connector brace 1825 within the wheel assembly to provide a stable position for the electrical connector 1632 to allow access to charging the wheel assembly battery and optional data exchange for use in diagnostics, upload of control data, etc.

FIG. 19 shows the electric motor and motor mount bracket of the illustrative embodiment, secured together to show the drive wheel 1662 of the flywheel assembly. The internal drive wheel 1662 is driven by the electric motor 1660 to cause rotation of the flywheel 1650 (not shown in FIG. 19). The control circuitry 1625 is shown in FIG. 19 as well as the data and charging plug 1632. The electrical hardware components of the control circuitry can include one or more microcontrollers or microprocessors that execute software instructions programmed into a local memory. These instructions enable the circuitry to control operation of the various devices contained within the circuitry and interconnected thereto. While not shown, the assembly can house additional sensors, lights and other electrically operated components. For example, LEDs or other lighting elements can be employed in combination with reflective surfaces to provide a lightings effect as the flywheel rotates. Likewise, the assembly can include sensors that measure tilt or steer (solid state gyros or accelerometers for example). These can be used by the controller to determine when to speed up or slow down gyro rotation, depending upon the historical and/or immediate severity of turns and tilts. Such sensors and the feedback they generate for the control circuitry can be used to aid new riders by automatically increasing the gyro effect based upon perceived severity of falls, etc.

Referring now to FIG. 20, the components of the wheel assembly and flywheel assembly are shown in exploded view from the back of the wheel assembly. As shown, in an illustrative embodiment the flywheel has a structure such that a greater portion of the flywheel mass is displaced proximate the outer edge 2010, while the inner portion 2012 of the flywheel 1650 is narrower and has less mass. This allows the majority of the mass (weight) of the flywheel 1650 to be displaced at the outer edge 2010 of the flywheel 1650 to thereby improve the spinning induced by the flywheel and the overall stabilization induced on the wheeled vehicle. In alternate embodiments the flywheel can include spokes between the outer edge and the hub. Likewise, the flywheel body can be constructed from a lightweight material such as polymer or aluminum, and include individual inserts or a continuous ring of heavier material adjacent to the outer edge, such as lead. Furthermore, the flywheel can include one or more water/liquid-filled sections to enhance and distribute weight.

An assembly of foam dampers 2050 is shown. These dampers extend between the plate 1655 and associated pockets (not shown) in the inner surface of the shell 1550. In an embodiment, the dampers are 15 mm×15 mm in cross section and 25 mm in length. The foam dampers in this embodiment are constructed of a pliable synthetic foam material (one of a variety of types and compounds) work in conjunction (in parallel) with the springs 1621 to absorb vibrations and mechanical noise within the moving motor mount assembly. This reduces wear on the motor's drive tire, which might otherwise occur in an undamped system as the tire bounces with respect to the flywheel surface. In this embodiment, each damper extends between the inner surface of the adjacent shell and the surface of the motor mount plate. Alternatively, a damping material or device can be operatively connected to another portion of the motor mount in a manner that damps the deflection of the spring assembly. For example, in an embodiment, foam dampers can be positioned as tubes that surround the springs and/or reside within the interior of each spring. The number of discrete dampers employed is also highly variable as is/are the geometric shape(s) thereof.

Also shown in FIG. 20 is the push button 1530 that provides a straightforward mechanism for controlling the speed settings of the electric motor. The push button 1530 is operatively connected to the electric motor via control circuitry 1625 to select the speed of the internal drive wheel, as a low speed, medium speed or high speed. In alternate embodiments, the push button 1530 may be remotely located on the handlebars or other appropriate portion of the wheeled vehicle, or may alternatively be a type of system wherein the speed of the electrically driven internal wheel depends on the speed of the wheeled vehicle and flywheel assembly. In this manner, as the speed of the vehicle changes, requiring less gyroscopic speed to remain stable, the speed of the internal electrically driven wheel also changes respectively. In an embodiment, the speed of the motor can be regulated using a centrifugal switch that responds to the actual speed of the flywheel.

Figure 21:
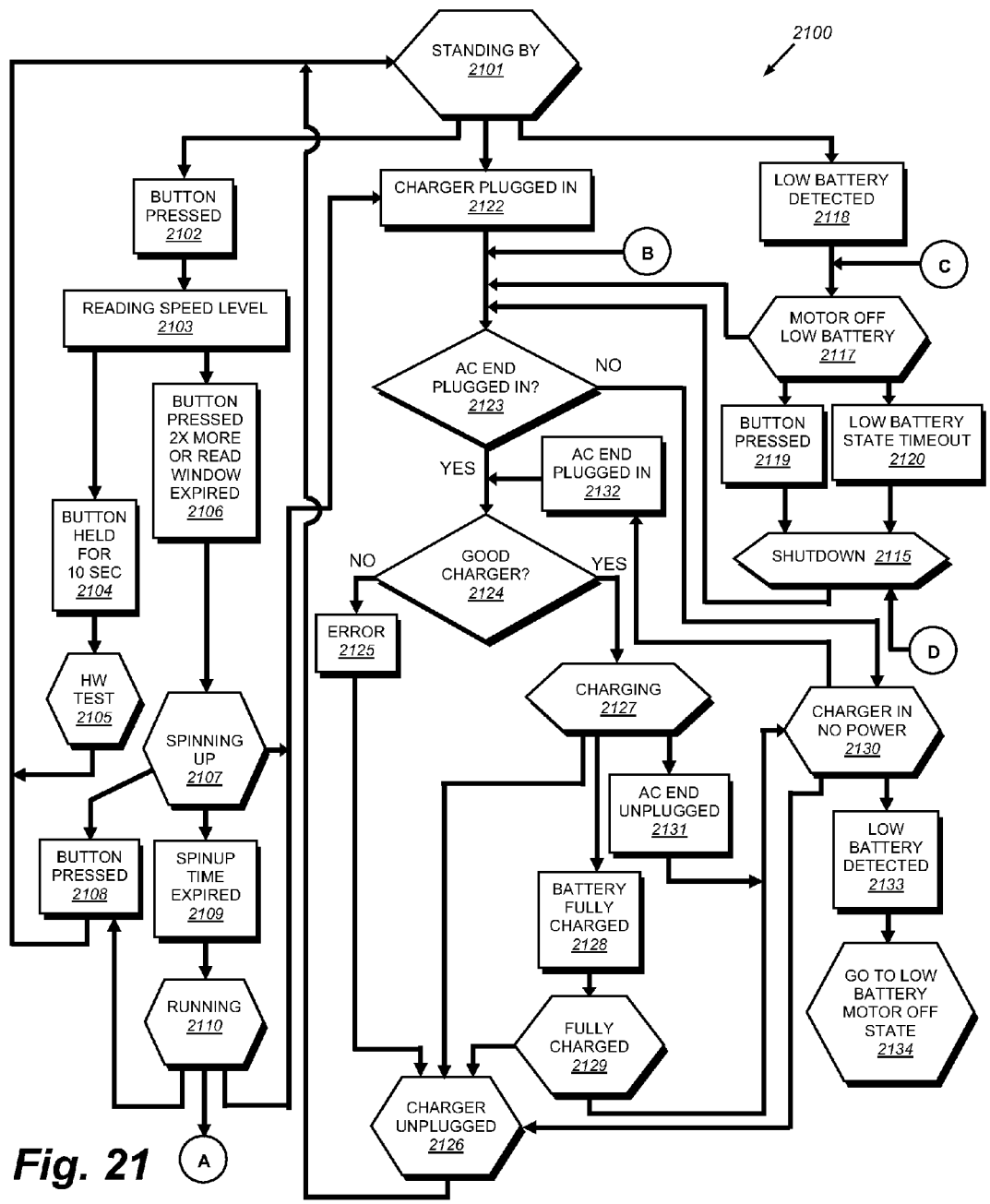
FIG. 21 is a flow chart showing a motor control procedure having various modes according to an illustrative embodiment of the invention.
Figure 21:
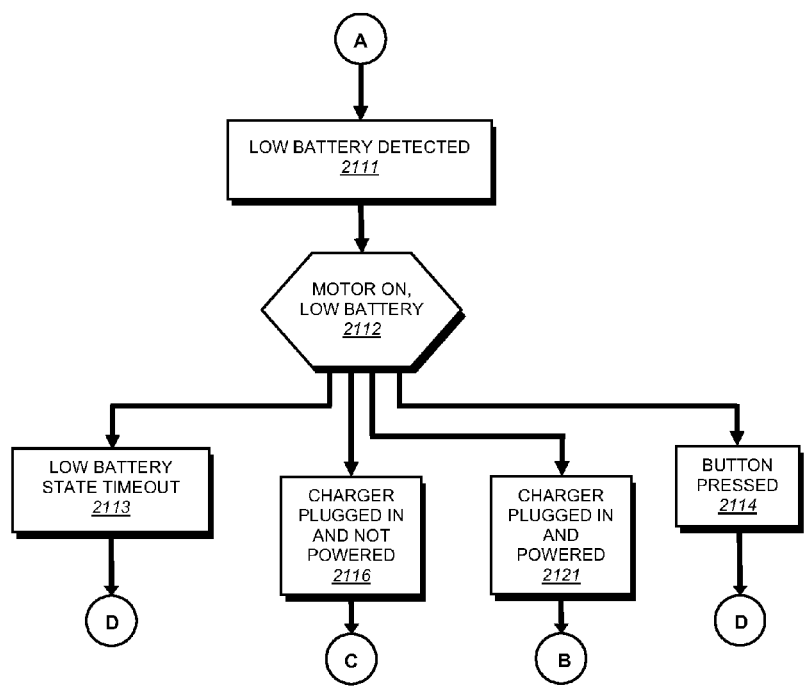

FIG. 21 details a flow chart showing an illustrative motor control procedure 2100 used by the control circuitry according to an illustrative embodiment of the invention. As shown in FIG. 21, the motor control procedure 2100 includes a plurality of optional "modes" or "states" of the system, shown as hexagon-shaped boxes of the procedure 2100. The procedure 2100 has an initial "standing-by" state 2101 in which the system is in standing-by mode. If a button is pressed in step 2102 (for example the push button 1530 shown in FIGS. 15, 17, 18 and 20) the procedure advances from step 2102, to step 2103 where the speed level is read. Optionally, if the button is held for 10 seconds, at step 2104, then the procedure advances to a hardware (HW) test state 2105, in which a hardware test is performed, and the system then returns to the standing-by state 2101. Note that the 10-second hold can be substituted the entry of a code via the button or data connector that initiates the hardware test in step 2105. If the button is pressed two or more times, or the "read" time window expires, at step 2106, the procedure advances to a "spinning up" mode at procedure step 2107. Based upon the button-press, the motor is allowed to advance to the next speed level, if any. If the button is pressed at step 2108, the procedure returns to the standing-by state at 2101. If the spin-up time has expired at step 2109, the motor continues to running mode at step 2110 at the set speed level. From this mode, if a button is pressed, it then returns to step 2108 and back to standing-by state 2101. When the button is pressed and the speed level is zero, the spin-up step 2107 directs that power sufficient to provide the low speed level be applied to the motor. When the speed level is read as low, another button press triggers the spin-up step 2107 to provide more power to the motor, so as to attain a medium speed level. When the (user input) speed level at step 2103 is read as medium, after a button press, then the spin-up step applies a maximum power to the motor so as to achieve maximum speed. Likewise, when a maximum speed is read, after a button press, the spin-up step 2107 directs that power be removed from the motor. The circuit element for increasing or removing power can be a variable resistor arrangement or any acceptable power-varying component operatively connected to the processor carrying out the procedure 2100.

While not shown, spin-up mode can include a number of stepped increases in power level that are timed approximately to the relative flywheel speed. That is, the power supplied to the motor in increased in small increments between absolute speed levels (low, medium, high) so that the motor is not overpowered, and dragging against the flywheel as it gradually accelerates, under the increased motor torque.

However, if a low battery is detected during the running mode at step 2110, the procedure advances (via branch 'A') to step 2111 where the detection of a low battery is identified by the procedure 2100. This advances the procedure to a motor-on, low-battery mode at step 2112. The motor is still on, and the low battery is detected and a low battery state timeout is detected at step 2113. This advances the procedure (via branch 'D') to the shutdown mode at step 2115. Similarly, if the low battery is detected, and the button is pressed at step 2114, the procedure also advances (via branch 'D') to the shutdown mode at step 2115. If the low battery is detected and the charger is plugged in, yet the system is not powered at step 2116, the procedure advances (via branch 'C') to the motor off, low battery mode at procedure step 2117. This is the same result as the system detecting a low battery at step 2118 during the standing-by mode 2101 of motor control.

The motor control procedure 2100 in motor-off, low-battery mode at step 2117 is then either advanced to the shutdown mode (step 2115), by a button being pressed at step 2119, or the state timeout from the low battery at step 2120. Furthermore, a charger (not shown) can be plugged in, resulting in the motor-off, low-battery mode advancing to decision step 2123 where the procedure determines if the charger's A/C current end (or other current source) is plugged in and active. The procedure 2100 also advances to decision step 2123 if the charger is plugged in while the motor control is in a running mode at step 2110 (via branch 'B'), or if the charger is plugged in while the motor control is in a standing by mode at step 2101. If it is determined that the charger end is plugged in at decision step 2123, then the procedure advances to step 2124 to determine if this is a proper type, and properly functioning ("good"), charger at decision step 2124.

If the charger is not a good charger, then the procedure 2100 advances to step 2125 and an error is generated, and the system enters a charger-unplugged mode at step 2126, in which case the motor control returns to a standing-by state at step 2101. If the charger is found to be a good charger at decision step 2124, then the motor control procedure is placed in charging mode at step 2127. Conversely, if the charger is then unplugged, then the procedure 2100 branches to the charger unplugged mode at step 2126 which returns the motor control to a standing-by mode. If the battery is found to be fully charged, at step 2128, the motor control procedure is in a fully charged mode at step 2129 until the charger is either unplugged, so as to enter unplugged mode at step 2126, or until there is no longer fully charged power, and the procedure enters the charger in, no power mode at step 2130. If the charger's A/C end is unplugged while the motor control procedure is in the charging mode at step 2127, this similarly causes the motor control to enter the charger in, no power mode 2130 via step 2131 as the detection of the A/C end as being unplugged.

The motor control procedure in a charger-in, no-power mode at step 2130 then either is plugged in at step 2132, which returns to the decision step 2124 to determine if it is a good charger. If a low battery is detected at step 2133, the system enters a low battery motor off state at procedure mode step 2134. If the charger becomes unplugged, the procedure advances to the charger unplugged mode at step 2126, which again returns the motor control procedure to a standing by mode.

It should be clear that the above-described procedure 2100 for controlling operation of the drive motor is illustrative, and that a variety of alternate steps and/or functions can be provided. For example, the motor can be controlled by a relatively straightforward analog circuit that employs a variable resistor circuit to control speed, or that provides a basic on/off functionality with or without an incremental increase in power to the motor during spin-up. Moreover, as described generally above, the motor can be constructed and arranged to feed back power consumption and speed information that is used to more accurately regulate the application of additional power during spin-up, in accordance with conventional feedback control techniques. Likewise, as described above, the motor can be operatively connected with a regenerative circuit that converts rotation of the motor into recharging current that is fed to the batteries when the switch is shut off and the flywheel decelerates to a stop. Moreover, the initialization of the control procedure has been omitted. In general, this can include a number of hardware and software reset functions from an appropriate entry point. In addition, the system can check for such stored data as wheel size and firmware version to aid in providing proper operation.

Figure 22:
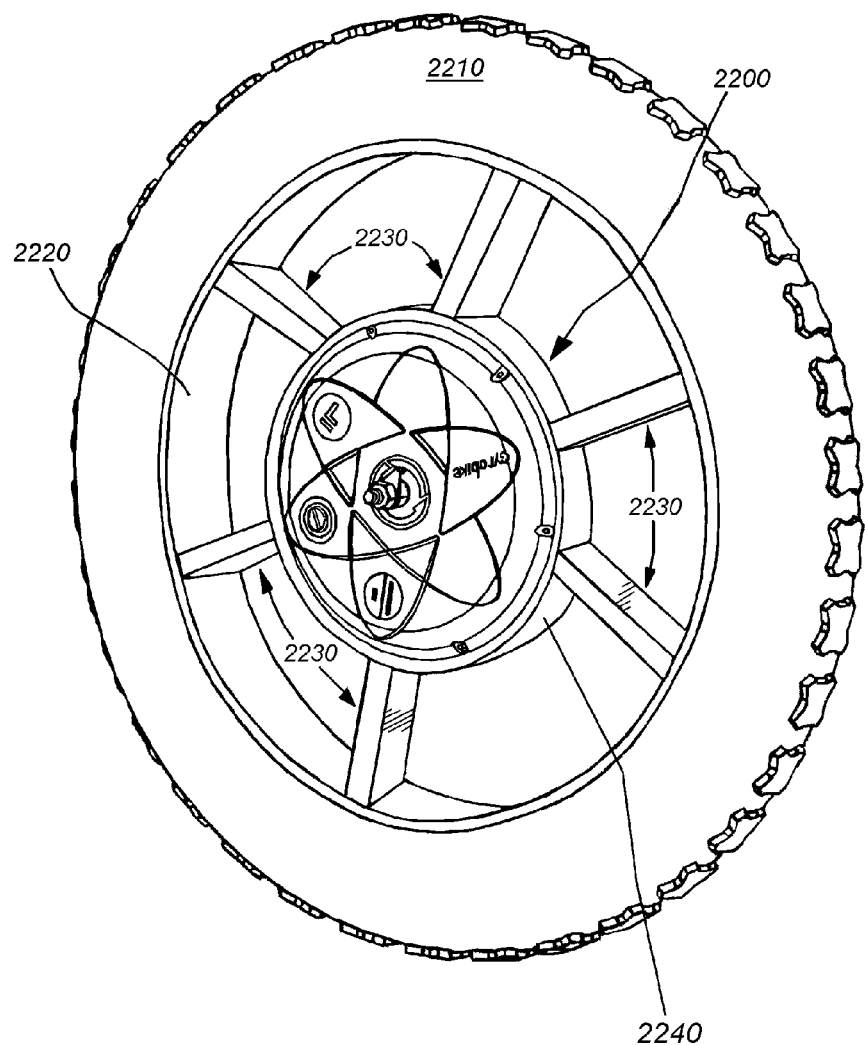
FIG. 22 is a fragmentary side view of an illustrative wheel assembly that is adaptable to larger-diameter tires according to an alternate embodiment of this invention.

Having now described an illustrative embodiment off the wheel and flywheel assembly of the present invention, and the motor control procedure for implementing the embodiments herein, alternate embodiments are now presented. Reference is made to FIG. 22 showing an alternate embodiment of the present invention in which an adjustably sized wheel assembly 2200 is constructed and arranged to be placed on a larger sized tire 2210. As shown, there is a larger sized rim 2220 having spokes 2230 and an inner rim 2240 into which the wheel assembly 2200 is placed. This provides for a variety of sizes and alternate types of wheel arrangements for various wheeled vehicles to provide stabilization thereto. As shown, the wheel includes an inner rim 2240 and outer rim 2220 having spokes 2230 therebetween to define an outer wheel adaptor such that the inner wheel assembly 2200 can be implemented on any size vehicle. The depicted alternate wheel assembly constructed and arranged to be adapted to fit any size tire, particularly a larger sized tire herein, is shown having a rim and spoke configuration, however any appropriate wheel can be implemented, including a single piece of material for the wheel adaptor to render the wheel assembly 2200 appropriate for all sizes of wheeled vehicles. In alternate embodiments, the spokes can be replaced with solid and/or ported annular spacers. Like attachment of the tire, the adaptor is mounted to the wheel assembly 2200 by securing the two opposing shell sides to its inner rim and securing the fasteners (screws) therebetween.

It should be clear that the embodiment of FIGS. 14-21 (and the alternate embodiment FIG. 22) provides an efficient (for example, the shell directly supports the tire), sturdy, safe (fingers cannot reach the flywheel) and novel arrangement for effecting the principles of this invention. It allows for mounting of a large variety of standard tires in a range of sizes and fitment to a wide range of conventional wheel mountings. The parameters herein can be modified to fit the wheel mountings of other types of vehicles (for example tricycles and unicycles in a manner). Such modifications should be clear to those of ordinary skill, and can entail changes to the wheel mount (fork, for example) and/or the wheel assembly itself. Likewise, while the drive mechanism in these embodiments is an electric motor, it is contemplated that the shell construction can house an alternate drive mechanism, including a spring-loaded clockwork mechanism, a compressed air motor and storage tank (pumped using a bicycle pump, compressor or the like) or any of the manually applied and/or operated mechanisms described with reference to the embodiments of FIGS. 1-13. This includes, but is not limited to, a hand-pulled rack, cord pull and elastomeric drill tip. The shell can be adapted to provide access for any of these manually applied driving elements in a manner clear to those of skill. Thus, the term "drive mechanism" should be taken broadly to include an onboard electric motor, an onboard motor powered by alternate energy sources, and/or an assembly that includes an internal drive hub that interacts with an externally applied driving element.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, a hub comprising a pair of clamshell halves that is assembled around the disk can be employed in an alternate embodiment, such a hub cab have outer surfaces that act both as a shield for the disk and the radial load-bearing member between the inner and outer hubs. Similarly, solid spokes with appropriate grooves for nesting the disk can be used. A variety of other improvements and modifications to the wheel, disk or drive hub can be implemented within the spirit and scope of this invention. Finally, while the exemplary embodiment described herein has been applied to a bicycle suitable for small children, it is expressly contemplated that this stabilizing system can be applied to the steerable front wheels of a variety of wheeled vehicles, both motorized and human powered. In alternate embodiments, it can be applied to adult-sized vehicles, such as mountain bikes, unicycles, reclining bicycles, hand-pedaled cycles, mopeds, motorcycles and scooters to provide further stability and/or act as a training tool. In addition, in alternate embodiments it is expressly contemplated that the rotating mass (powered or unpowered) can be provided non-coaxially within the structure of the steerable front wheel, or steerable rear wheel where applicable. Appropriate mountings and/or spaces can be provided to allow the non-coaxial mass to rotate appropriately free of interference from the moving wheel. The size of the flywheel or other rotating mass in both a motorized and non-motorized embodiment, as well as any surrounding enclosure or shell can be varied in diameter and radial placement of the majority of mass to accommodate the diameter and width of the desired tire. Moreover, while electric motors are described herein, motors operating on other power sources, such as micro-internal combustion and pressurized gas (compressed air, for example) engines, can also be employed to spin the flywheel. Additionally, while a drive tire engages a surface of the flywheel to drive it, a variety of fixed interconnections, such as gears, flexible shafts, centrifugal clutch assemblies, and the like, can be employed in alternate embodiments. Where electronic control is provided, the control can be implemented as hardware, software consisting of computer-readable program instructions, or a combination of hardware and software. Accordingly, this description is meant to be taken only by way of example, and not to otherwise limit the scope of this invention.

What is claimed is:

1. A system for stabilizing a wheeled vehicle comprising:
a flywheel mounted with respect to a steerable wheel of the wheeled vehicle that has a characteristic precession so that the steerable wheel is urged in a direction of an unintentional bank to provide recovery in the form of steering from the bank, the steerable wheel being mounted on a steerable wheel mount having an axle and an inner hub coaxial with the axle that allows the steerable wheel to rotate relative to the axle and a steerable fork, wherein the flywheel is rotatably mounted on the axle with a bearing structure therebetween to allow the flywheel to rotate freely with respect to the inner hub;
a drive mechanism that is driven by an electric motor to thereby initiate rotation of the flywheel to a rotating state from a non-rotating state with respect to the inner hub while the inner hub and the steerable wheel are stationary and non-rotating; and
at least one battery that is operatively connected to deliver power to the electric motor,
wherein the battery, electric motor, drive mechanism, flywheel and a central portion of the axle are each enclosed within a shell that defines a rim supporting a tire.

2. The system as set forth in claim 1 wherein the flywheel is structured such that a greater portion of flywheel mass is displaced proximate an outer edge of the flywheel, and an inner portion of the flywheel is narrower and has less mass.

3. The system as set forth in claim 1 further comprising a push button operatively connected to the electric motor to commence rotation of the flywheel.

4. A system for stabilizing a wheeled vehicle comprising:
- a flywheel mounted with respect to a steerable wheel of the wheeled vehicle that has a characteristic precession so that the steerable wheel is urged in a direction of an unintentional bank to provide recovery in the form of steering from the bank, the steerable wheel being mounted on a steerable wheel mount having an axle and an inner hub coaxial with the axle that allows the steerable wheel to rotate relative to the axle and a steerable fork, wherein the flywheel is rotatably mounted on the axle with a bearing structure therebetween to allow the flywheel to rotate freely with respect to the inner hub;
- a drive mechanism that is driven by an electric motor to thereby initiate rotation of the flywheel to a rotating state from a non-rotating state with respect to the inner hub while the inner hub and the steerable wheel are stationary and non-rotating; and
- a groove-seated driving tire that is responsive to the drive mechanism by engaging a surface of the flywheel proximate an outer edge of the flywheel,
- wherein the electric motor, drive mechanism, groove-seated driving tire, flywheel and a central portion of the axle are each enclosed within a shell that defines a rim supporting a tire.

5. The system as set forth in claim 4 further comprising a motor mount assembly that secures the electric motor within the steerable wheel and that movably biases the groove-seated driving tire against the surface of the flywheel.

6. The system as set forth in claim 5 further comprising a pair of opposing springs that bias the groove-seated driving tire into contact with the flywheel and a damper assembly that damps deflection of the pair of opposing springs.

7. The system as set forth in claim 4 further comprising a push button operatively connected to the electric motor to commence rotation of the flywheel.

8. A system for stabilizing a wheeled vehicle comprising:
- a flywheel mounted with respect to a steerable wheel of the wheeled vehicle that has a characteristic precession so that the steerable wheel is urged in a direction of an unintentional bank to provide recovery in the form of steering from the bank, the steerable wheel being mounted on a steerable wheel mount having an axle and an inner hub coaxial with the axle that allows the steerable wheel to rotate relative to the axle and a steerable fork, wherein the flywheel is rotatably mounted on the axle with a bearing structure therebetween to allow the flywheel to rotate freely with respect to the inner hub;
- a drive mechanism that is driven by an electric motor to thereby initiate rotation of the flywheel to a rotating state from a non-rotating state with respect to the inner hub while the inner hub and the steerable wheel are stationary and non-rotating;
- at least one battery that is operatively connected to deliver power to the electric motor, wherein the battery, electric motor, drive mechanism, flywheel and a central portion of the axle are each enclosed within a shell that defines a rim supporting a tire; and
- a charging plug located on the shell to accessibly enable charge to the battery.

9. The system as set forth in claim 8 further comprising a push button operatively connected to the electric motor to commence rotation of the flywheel.

10. A system for stabilizing a wheeled vehicle comprising:
- a flywheel mounted with respect to a steerable wheel of the wheeled vehicle that has a characteristic precession so that the steerable wheel is urged in a direction of an unintentional bank to provide recovery in the form of steering from the bank, the steerable wheel being mounted on a steerable wheel mount having an axle and an inner hub coaxial with the axle that allows the steerable wheel to rotate relative to the axle and a steerable fork, wherein the flywheel is rotatably mounted on the axle with a bearing structure therebetween to allow the flywheel to rotate freely about an axis of rotation oriented in a direction of the axle with respect to the inner hub; and
- a drive mechanism positioned to initiate rotation of the flywheel to a rotating state from a non-rotating state with respect to the inner hub while the inner hub and the steerable wheel are stationary and non-rotating, the drive mechanism including a rotating drive member that engages a surface of the flywheel and that rotates on an axis approximately perpendicular to the axis of rotation of the flywheel,
- wherein the drive mechanism, flywheel and a central portion of the axle are each enclosed within a shell that defines a rim supporting a tire.

11. The system as set forth in claim 10 further comprising a motor mount assembly that movably biases the rotating drive member against the surface of the flywheel.

12. The system as set forth in claim 11 further comprising a pair of opposing springs that bias the rotating drive member into contact with the flywheel and a damper assembly that damps deflection of the pair of opposing springs.

* * * * *